US008995757B1

(12) United States Patent
Ciarcia et al.

(10) Patent No.: US 8,995,757 B1
(45) Date of Patent: Mar. 31, 2015

(54) AUTOMATED ROOF IDENTIFICATION SYSTEMS AND METHODS

(71) Applicant: Eagle View Technologies, Inc., Bothell, WA (US)

(72) Inventors: Christopher Albert Ciarcia, Monroe, WA (US); Chris Pershing, Redmond, WA (US)

(73) Assignee: Eagle View Technologies, Inc., Bothell, WA (US)

( * ) Notice: Subject to any disclaimer, the term of this patent is extended or adjusted under 35 U.S.C. 154(b) by 0 days.

(21) Appl. No.: 14/328,266

(22) Filed: Jul. 10, 2014

Related U.S. Application Data

(63) Continuation of application No. 14/086,885, filed on Nov. 21, 2013, which is a continuation of application No. 12/590,131, filed on Nov. 2, 2009, now Pat. No. 8,731,234.

(60) Provisional application No. 61/197,895, filed on Oct. 31, 2008.

(51) Int. Cl.
*G06K 9/00* (2006.01)
*G06K 9/62* (2006.01)

(52) U.S. Cl.
CPC .................................... *G06K 9/6256* (2013.01)
USPC ........................................... 382/155; 382/181

(58) Field of Classification Search
USPC .................................................. 382/155–161
See application file for complete search history.

(56) References Cited

U.S. PATENT DOCUMENTS 5,247,356 A 9/1993 Ciampa
5,633,995 A 5/1997 McClain (Continued)

FOREIGN PATENT DOCUMENTS

AU 2008230031 B1 11/2009
CA 2191954 A1 12/1995

(Continued)

OTHER PUBLICATIONS

"AeroDach® Online Roof Evaluation Standard Delivery Format and 3D Data File," Document Version 01.00. 2002 with alleged publication in 2002, 21 pages.

(Continued)

*Primary Examiner* — Alex Liew
(74) *Attorney, Agent, or Firm* — Seed IP Law Group PLLC

(57) ABSTRACT

Automatic roof identification systems and methods are described. Example embodiments include a roof estimation system configured to automatically detect a roof in a target image of a building having a roof. In one embodiment, automatically detecting a roof in a target image includes training one or more artificial intelligence systems to identify likely roof sections of an image. The artificial intelligence systems are trained on historical image data or an operator-specified region of interest within the target image. Then, a likely outline of the roof in the target image can be determined based on the trained artificial intelligence systems. The likely roof outline can be used to generate a roof estimate report. This abstract is provided to comply with rules requiring an abstract, and it is submitted with the intention that it will not be used to interpret or limit the scope or meaning of the claims.

20 Claims, 36 Drawing Sheets
(30 of 36 Drawing Sheet(s) Filed in Color)

(56) References Cited

U.S. PATENT DOCUMENTS

| | | | | |
|---|---|---|---|---|
| 5,936,628 | A * | 8/1999 | Kitamura et al. | 345/420 |
| 6,323,885 | B1 | 11/2001 | Wiese | |
| 6,333,749 | B1 | 12/2001 | Reinhardt et al. | |
| 6,385,541 | B1 | 5/2002 | Blumberg et al. | |
| 6,396,491 | B2 | 5/2002 | Watanabe et al. | |
| 6,446,053 | B1 | 9/2002 | Elliott | |
| 6,496,184 | B1 * | 12/2002 | Freeman et al. | 345/419 |
| 6,636,803 | B1 | 10/2003 | Hartz, Jr. et al. | |
| 6,836,270 | B2 | 12/2004 | Du | |
| 6,873,718 | B2 * | 3/2005 | O'Donnell et al. | 382/131 |
| 6,980,690 | B1 | 12/2005 | Taylor et al. | |
| 7,003,400 | B2 | 2/2006 | Bryant | |
| 7,006,977 | B1 | 2/2006 | Attra et al. | |
| 7,020,326 | B1 * | 3/2006 | Hsu | 382/155 |
| 7,106,893 | B2 * | 9/2006 | Bankman et al. | 382/128 |
| 7,133,551 | B2 | 11/2006 | Chen et al. | |
| 7,142,693 | B2 * | 11/2006 | Zhang et al. | 382/100 |
| 7,305,983 | B1 | 12/2007 | Meder et al. | |
| 7,324,666 | B2 | 1/2008 | Zoken et al. | |
| 7,327,880 | B2 | 2/2008 | Tek | |
| 7,333,963 | B2 * | 2/2008 | Widrow et al. | 706/18 |
| 7,343,268 | B2 | 3/2008 | Kishikawa | |
| 7,373,303 | B2 | 5/2008 | Moore et al. | |
| 7,424,133 | B2 | 9/2008 | Schultz et al. | |
| 7,487,114 | B2 | 2/2009 | Florance et al. | |
| 7,500,391 | B2 | 3/2009 | Woro | |
| 7,509,241 | B2 | 3/2009 | Guo et al. | |
| 7,519,206 | B2 | 4/2009 | Mulet-Parada et al. | |
| 7,583,275 | B2 | 9/2009 | Neumann et al. | |
| 7,752,018 | B2 | 7/2010 | Rahmes et al. | |
| 7,787,659 | B2 | 8/2010 | Schultz et al. | |
| 7,844,499 | B2 | 11/2010 | Yahiro et al. | |
| 7,873,238 | B2 | 1/2011 | Schultz et al. | |
| 7,991,226 | B2 | 8/2011 | Schultz et al. | |
| 7,995,799 | B2 | 8/2011 | Schultz et al. | |
| 7,995,862 | B2 | 8/2011 | Tao et al. | |
| 8,051,089 | B2 | 11/2011 | Gargi et al. | |
| 8,064,670 | B2 | 11/2011 | Higgs et al. | |
| 8,068,643 | B2 | 11/2011 | Schultz et al. | |
| 8,077,969 | B2 | 12/2011 | Rossato et al. | |
| 8,078,436 | B2 | 12/2011 | Pershing et al. | |
| 8,081,841 | B2 | 12/2011 | Schultz et al. | |
| 8,126,268 | B2 | 2/2012 | Rossato et al. | |
| 8,131,514 | B2 | 3/2012 | Royan et al. | |
| 8,145,578 | B2 | 3/2012 | Pershing et al. | |
| 8,170,840 | B2 | 5/2012 | Pershing | |
| 8,209,152 | B2 | 6/2012 | Pershing | |
| 8,233,666 | B2 | 7/2012 | Schultz et al. | |
| 8,385,672 | B2 | 2/2013 | Giuffrida et al. | |
| 8,401,222 | B2 | 3/2013 | Thornberry et al. | |
| 8,407,053 | B2 | 3/2013 | Latorre et al. | |
| 8,417,061 | B2 | 4/2013 | Kennedy et al. | |
| 8,520,079 | B2 | 8/2013 | Schultz et al. | |
| 8,531,472 | B2 | 9/2013 | Freund et al. | |
| 8,538,151 | B2 | 9/2013 | Shimamura et al. | |
| 8,588,547 | B2 | 11/2013 | Giuffrida et al. | |
| 8,593,518 | B2 | 11/2013 | Schultz et al. | |
| 2002/0154174 | A1 | 10/2002 | Redlich et al. | |
| 2003/0028393 | A1 | 2/2003 | Coulston et al. | |
| 2003/0147553 | A1 * | 8/2003 | Chen et al. | 382/154 |
| 2003/0171957 | A1 | 9/2003 | Watrous | |
| 2003/0174892 | A1 * | 9/2003 | Gao et al. | 382/225 |
| 2003/0233310 | A1 | 12/2003 | Stavrovski | |
| 2005/0129306 | A1 * | 6/2005 | Wang et al. | 382/156 |
| 2005/0288959 | A1 | 12/2005 | Eraker et al. | |
| 2006/0072802 | A1 * | 4/2006 | Higgs et al. | 382/131 |
| 2006/0137736 | A1 | 6/2006 | Nishitani et al. | |
| 2006/0200311 | A1 | 9/2006 | Arutunian et al. | |
| 2006/0232605 | A1 | 10/2006 | Imamura | |
| 2006/0262112 | A1 | 11/2006 | Shimada | |
| 2006/0265287 | A1 | 11/2006 | Kubo | |
| 2007/0058850 | A1 * | 3/2007 | Luo et al. | 382/132 |
| 2007/0179757 | A1 | 8/2007 | Simpson | |
| 2007/0291994 | A1 * | 12/2007 | Kelle et al. | 382/110 |
| 2008/0221843 | A1 | 9/2008 | Shenkar et al. | |
| 2009/0010546 | A1 * | 1/2009 | Rossato et al. | 382/199 |
| 2009/0016603 | A1 * | 1/2009 | Rossato et al. | 382/173 |
| 2009/0248417 | A1 * | 10/2009 | Latorre et al. | 704/260 |
| 2010/0110074 | A1 * | 5/2010 | Pershing | 345/423 |
| 2011/0033110 | A1 * | 2/2011 | Shimamura et al. | 382/173 |
| 2011/0096083 | A1 | 4/2011 | Schultz | |
| 2011/0187713 | A1 | 8/2011 | Pershing et al. | |
| 2013/0216089 | A1 | 8/2013 | Chen et al. | |
| 2014/0099029 | A1 * | 4/2014 | Savvides et al. | 382/197 |

FOREIGN PATENT DOCUMENTS

| | | | |
|---|---|---|---|
| DE | 198 57 667 | A1 | 8/2000 |
| EP | 1 010 966 | B1 | 10/2002 |
| EP | 2 251 833 | A2 | 11/2010 |
| WO | 00/29806 | A2 | 5/2000 |
| WO | 2005/124276 | A2 | 12/2005 |
| WO | 2006/040775 | A2 | 4/2006 |
| WO | 2006/090132 | A2 | 8/2006 |
| WO | 2011/094760 | A2 | 8/2011 |

OTHER PUBLICATIONS

Australian Office Action for Australian Application No. 2010201839, dated Apr. 14, 2011, 2 pages.

Autodesk, "Autodesk ImageModeler—Features," retrieved on Sep. 30, 2008, from http :///usa.autodesk.com/adsk/servlet/index?siteID=123112&id=115639 . . . ,1 page.

Automatic House Reconstruction, retrieved on Sep. 29, 2008, from http://www.vision.ee.ethz.ch/projects/Amobe_I/recons.html, 7 pages.

Baillard et al., "Automatic reconstruction of piecewise planar models from multiple views," CVPR99, vol. 2, 1999, pp. 559-565, 7 pages.

Bignone et al., "Automatic Extraction of Generic House Roofs from High Resolution Aerial Imagery," *Proc. ECCV*, 1996, 12 pages.

Canadian Office Action, for Canadian Application No. 2,641,373, dated Jan. 9, 2012, 4 pages.

Chevrier et al., "Interactive 3D reconstruction for urban areas—An image based tool," *CAAD Futures*, 2001, 13 pages.

Ciarcia et al., "Automated Roof Identification Systems and Methods," U.S. Appl. No. 12/590,131, filed Nov. 2, 2009, 74 pages.

Ciarcia et al., "Automated Roof Identification Systems and Methods," U.S. Appl. No. 12/590,131, Notice of Allowance, mailed Aug. 26, 2013, 9 pages.

Ciarcia et al., "Automated Roof Identification Systems and Methods," Office Action mailed Jan. 9, 2013, for U.S. Appl. No. 12/590,131, 14 pages.

Debevec et al., "Modeling and Rendering Architecture from Photographs: A hybrid geometry—and image-based approach," *SIGGRAPH conference proceedings*, retrieved from www.cs.berkeley.edu/~malik/papers/debevecTM96.pdf., 1996, 10 pages.

Delaney, "Searching for Clients From Above—More Small Businesspeople Use Aerial Mapping Services to Scout Potential Customers," *The Wall Street Journal*, Jul. 31, 2007, retrieved on Feb. 25, 2010, from http://online.wsj.com/public/article/SB118584306224482891.html?mod=yahoo_free, 3 pages.

Faugeras et al., "3-D reconstruction of Urban Scenes from Sequences of Images," Institut National De Recherche En Informatique Et En Automatique, No. 2572, Jun. 1995, 27 pages.

Gülch et al., "On the Performance of Semi-Automatic Building Extraction," In the International Archives of Photogrammetry and Remote Sensing, vol. 23, 8 pages, 1998.

Henricsson et al., "3-D Building Reconstruction with ARUBA: A Qualitative and Quantitative Evaluation," Institute of Geodesy and Photogrammerty, Swiss Federal Institute of Technology, 2001, 13 pages.

International Search Report for International Application No. PCT/US11/23408, mailed Aug. 11, 2011, 2 pages.

Lueders, "Infringement Allegations by EagleView Technologies," Feb. 10, 2009, 3 pages.

Mann, "Roof with a view," *Contract Journal 431*(6552):29, Nov. 23, 2005, 2 pages.

Miller et al., "Miller's Guide to Framing and Roofing," McGraw Hill, New York, pp. 131-136 and 162-163, 2005, 9 pages.

(56) References Cited

OTHER PUBLICATIONS

Noronha et al., "Detection and Modeling of Buildings from Multiple Aerial Images," Institute for Robotics and Intelligent Systems, University of Southern California, Nov. 27, 2001, 32 pages.
Noronha et al., "Detection and Modeling of Buildings from Multiple Aerial Images," *IEEE Transactions on Pattern Analysis and Machine Intelligence 23*(5):501-518, 2001, 32 pages.
Pershing et al., "Aerial Roof Estimation System and Method," Notice of Allowance mailed Feb. 3, 2012, for U.S. Appl. No. 12/148,439, 35 pages.
Pershing et al., "Aerial Roof Estimation System and Method," Office Action mailed Apr. 25, 2011, for U.S. Appl. No. 12/148,439, 52 pages.
Pershing et al., "Aerial Roof Estimation System and Method," Office Action mailed Aug. 16, 2010, for U.S. Appl. No. 12/148,439, 47 pages.
Pershing et al., "Aerial Roof Estimation System and Method," Office Action mailed Aug. 25, 2011, for U.S. Appl. No. 12/148,439, 77 pages.
Pershing et al., "Aerial Roof Estimation Systems and Methods," Notice of Allowance mailed Oct. 14, 2011, for U.S. Appl. No. 12/253,092, 30 pages.
Pershing et al., "Aerial Roof Estimation Systems and Methods," Office Action mailed May 10, 2011, for U.S. Appl. No. 12/253,092, 26 pages.
Pershing, "Concurrent Display Systems ANF Methods for Aerial Roof Estimation," Notice of Allowance mailed Feb. 16, 2012, for U.S. Appl. No. 12/467,250, 19 pages.
Pershing, "Concurrent Display Systems ANF Methods for Aerial Roof Estimation," Office Action mailed Sep. 7, 2011, for U.S. Appl. No. 12/467,250, 14 pages.
Pershing, "Pitch Determination Systems and Methods for Aerial Roof Estimation," Notice of Allowance mailed Feb. 16, 2012, for U.S. Appl. No. 12/467,244, 20 pages.
Pershing, "Pitch Determination Systems and Methods for Aerial Roof Estimation," Office Action mailed Aug. 26, 2011, for U.S. Appl. No. 12/467,244, 17 pages.
PhotoModeler, "Measuring & Modeling the Real World," retrieved Sep. 30, 2008, from http://www.photomodeler.com/products/photomodeler.htm, 2 pages.
Pictometry Online, "Government," Oct. 7, 2008, retrieved Aug. 10, 2011, from http://web.archive.org/web/20081007111115/http://www.pictometry.com/government/prod . . . , 3 pages.
Pictometry, "Electronics Field Study™ Getting Started Guide," Version 2.7, Jul. 2007, 15 pages.
Pictometry, "FAQs," Sep. 22, 2008, retrieved on Aug. 10, 2011, from http ://www.web.archive.org/web/20080922013233/http://www.pictometry.com/about_us/faqs.sht . . . , 3 pages.
Pictometry.com, "Frequently Asked Questions," retrieved on Apr. 9, 2011, from http://replay.waybackmachine.org/20050801231818/http:///www.pictometry.com/faq.asp, 10 pages.
Pictometry.com, "Frequently Asked Questions," retrieved on Feb. 10, 2012, from http://replay.waybackmachine.org/20050801231818/http:///www.pictometry.com/faq.asp, 6 pages.
Pictometry.com, "Pictometry Announces Software and Web-based Solution for Engineers, Architects, and Planners," Press Release, Jan. 22, 2004, 3 pages.
Poullis et al., "Photogrammetric Modeling and Image-Based Rendering for Rapid Virtual Environment Creation," http://handle.dtic.mil/100.2/ADA433420, 1998, 7 pages.
Precigeo.com, "Welcome to precigeo™," "Welcome to precigeoRoof," "Why precigeoRoof," "How precigeoRoof Works," "How precigeoRoof Can Help Me," all retrieved on Feb. 26, 2010, from http://web.archive.org/, pp. 1-5; "Why precigeoRisk Works," and "Welcome to precigeoRisk," retrieved on Aug. 14, 2010, from http://web.archive.org, pp. 6-11, 11 pages total.
Scholze et al., "A Probabilistic Approach to building Roof Reconstruction Using Semantic Labeling," *Pattern Recognition 2449/2002*, Springer Berlin/Heidelberg, 2002, 8 pages.
Schutzberg et al., "Microsoft's MSN Virtual Earth: The Map is the Search Platform," *Directions Magazine*, retrieved Feb. 6, 2009, from http://www.directionsmag.com/article.php?article_id=873&try=1, 10 pages.
Transcriptions of points of potential interest in the attached YouTube video titled: "Pictometry Online Demo," retrieved Feb. 25, 2010.
U.S. Appl. No. 60/425,275, filed Nov. 8, 2002, 32 pages.
Written Opinion for International Application No. PCT/US11/23408, mailed Aug. 11, 2011, 5 pages.
www.archive.org Web site showing alleged archive of German Aerowest Web Site http://aerowest.de/ from Feb. 6, 2006 (retrieved Sep. 20, 2012) and translated to English, 61 pages.
www.archive.org, Web site showing alleged archive of German AeroDach Web Site http://www.areodach.de from Jun. 13, 2004 (retrieved Sep. 20, 2012) and translations to English, 21 pages.
YouTube, "Pictometry Online Demo," DVD, Feb. 25, 2010.
YouTube, "Pictometry Online Demo," retrieved on Feb. 6, 2006, from http://www.youtube.com/watch?v=jURSKo0OD0, 1 page.
Ziegler et al., "3D Reconstruction Using Labeled Image Regions," Mitsubishi Research Laboratories, http://www.merl.com, Jun. 2003, 14 pages.

* cited by examiner

206

204

294

292

7 degrees of Freedom

Translation: Tx,Ty,Tz
Rotation: Rx,Ry,Rz
Scale: Sc

360

AUTOMATED ROOF IDENTIFICATION SYSTEMS AND METHODS

CROSS REFERENCE TO RELATED APPLICATIONS

This application is a continuation of U.S. patent application Ser. No. 14/086,885, entitled "AUTOMATED ROOF IDENTIFICATION SYSTEMS AND METHODS," filed Nov. 21, 2013, which is a continuation of U.S. patent application Ser. No. 12/590,131, entitled "AUTOMATED ROOF IDENTIFICATION SYSTEMS AND METHODS," filed Nov. 2, 2009, which claims the benefit of U.S. Provisional Patent Application No. 61/197,895, entitled "AUTOMATED TECHNIQUES FOR ROOF ESTIMATION," filed Oct. 31, 2008, which are incorporated herein by reference in their entireties.

BACKGROUND

1. Field of the Invention

This invention relates to automated systems and methods for estimating construction projects, and more particularly, to such systems and methods for automatically identifying a roof in an image of a building having a roof.

2. Description of the Related Art

Homeowners typically ask several roofing contractors to provide written estimates to repair or replace a roof on a house. Heretofore, the homeowners would make an appointment with each roofing contractor to visit the house to determine the style of roof, take measurements, and to inspect the area around the house for access and cleanup. Using this information, the roofing contractor then prepares a written estimate and then timely delivers it to the homeowner. After receiving several estimates from different rooting contractors, the homeowner then selects one.

A number of factors impact a roofing contractor's ability to provide a timely written estimate. One factor is the size of the roof contractor's company and the location of the roofing jobs currently underway. Most roof contractors provide roofing services and estimates to building owners over a large geographical area. Larger roof contractor companies hire one or more trained individuals who travel throughout the entire area providing written estimates. With smaller roofing contractors, the owner or a key trained person is appointed to provide estimates. With both types of companies, roofing estimates are normally scheduled for buildings located in the same area on a particular day. If an estimate is needed suddenly at a distant location, the time for travel and the cost of commuting can be prohibitive. If the roofing contractor is a small company, the removal of the owner or key person on a current job site can be time prohibitive. Other factors that may impact the roofing contractor's ability to provide a written estimate include weather, traffic, and the like.

Recently, solar panels have become popular. In order to install solar panels, the roof's slope, geometrical shape, and size as well as its orientation with respect to the sun all are typically determined in order to provide an estimate of the number and type of solar panels that can be situated on the roof. An estimator's ability to determine such measurements is impacted by factors that are similar to those described above.

SUMMARY

In one embodiment, a method of automatically detecting a roof in an image of a building having a roof is provided. The method includes receiving an indication of a target image; computing statistical measures for sections of the target image; inputting to an artificial intelligence system the computed statistical measures, the artificial intelligence system trained to indicate whether a roof is shown in a section of an image; receiving from the artificial intelligence system indications of whether a roof is shown in the sections of the target image; determining, based on the indications of whether a roof is shown in the sections of the target image, a likely outline of the roof in the target image; and storing the determined likely outline of the roof.

In another embodiment, a method for automatically detecting a roof in an image of a building having a roof is provided. The method includes training an artificial intelligence ("AI") system with a second image of a building having a roof, the training based on statistical measures computed for sections of the second image, the training resulting in the AI system being configured to indicate whether a roof is shown in a section of an image. The method includes providing to the AI system statistical measures computed for sections of the first image. The method also includes receiving from the AI system indications of whether a roof is shown in the sections of the first image. The method further includes determining, based on the indications of whether a roof is shown in the sections of the first image, a likely outline of the roof in the first image.

In another embodiment, a method for automatically detecting a roof in an image of a building having a roof is provided. The method includes inputting to the associative network statistical measures computed for sections of the first image. The method also includes receiving from the associative network indications of whether a roof is shown in the sections of the first image. The method further includes determining, based on the indications of whether a roof is shown in the sections of the first image, a likely outline of the roof in the first image. The method also includes training an associative network with one or more other images of a building having a roof, the training based on statistical measures computed for sections of the second image, the training resulting in the associative network being configured to indicate whether a roof is shown in a section of an image.

Other embodiments provide systems and computer-readable storage media that are configured to identify roofs by executing methods similar to the above.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Embodiments described herein provide enhanced computer- and network-based methods, techniques, and systems for estimating construction projects based on one or more images of a structure. Example embodiments provide a Roof Estimation System ("RES") that is operable to provide a roof estimate report for a specified building, based on one or more aerial images of the building. In one embodiment, a customer of the roof estimation system specifies the building by providing an address of the building. The roof estimation system then obtains one or more aerial images showing at least portions of the roof of the building. Next, the roof estimation system generates a model of the roof of the building, which is then utilized to determine roof measurement information. The roof measurement information may include measurements such as lengths of the edges of sections of the roof, pitches of sections of the roof, areas of sections of the roof, etc. The model of the roof and/or the roof measurement information is then used to generate a roof estimate report. The roof estimate report includes one or more line drawings of the roof of the building, which are annotated with information about the roof, such as lengths of the edges of sections of the roof, pitches of sections of the roof, areas of sections of the roof, etc.

In some embodiments, some or all of the functions of the roof estimation system are performed automatically. For example, one embodiment performs automated roof detection, such as by using computer processing to identify a roof in an image of a building having a roof. In another embodiment, the outline shape of the roof is determined by computer analysis of a photograph of the building. Another embodiment performs computer driven image registration, such as by correlating multiple images showing different viewpoints of a building. At least some embodiments include an artificial intelligence ("AI") system that is configured to perform various roof estimation functions automatically.

Figure 1:
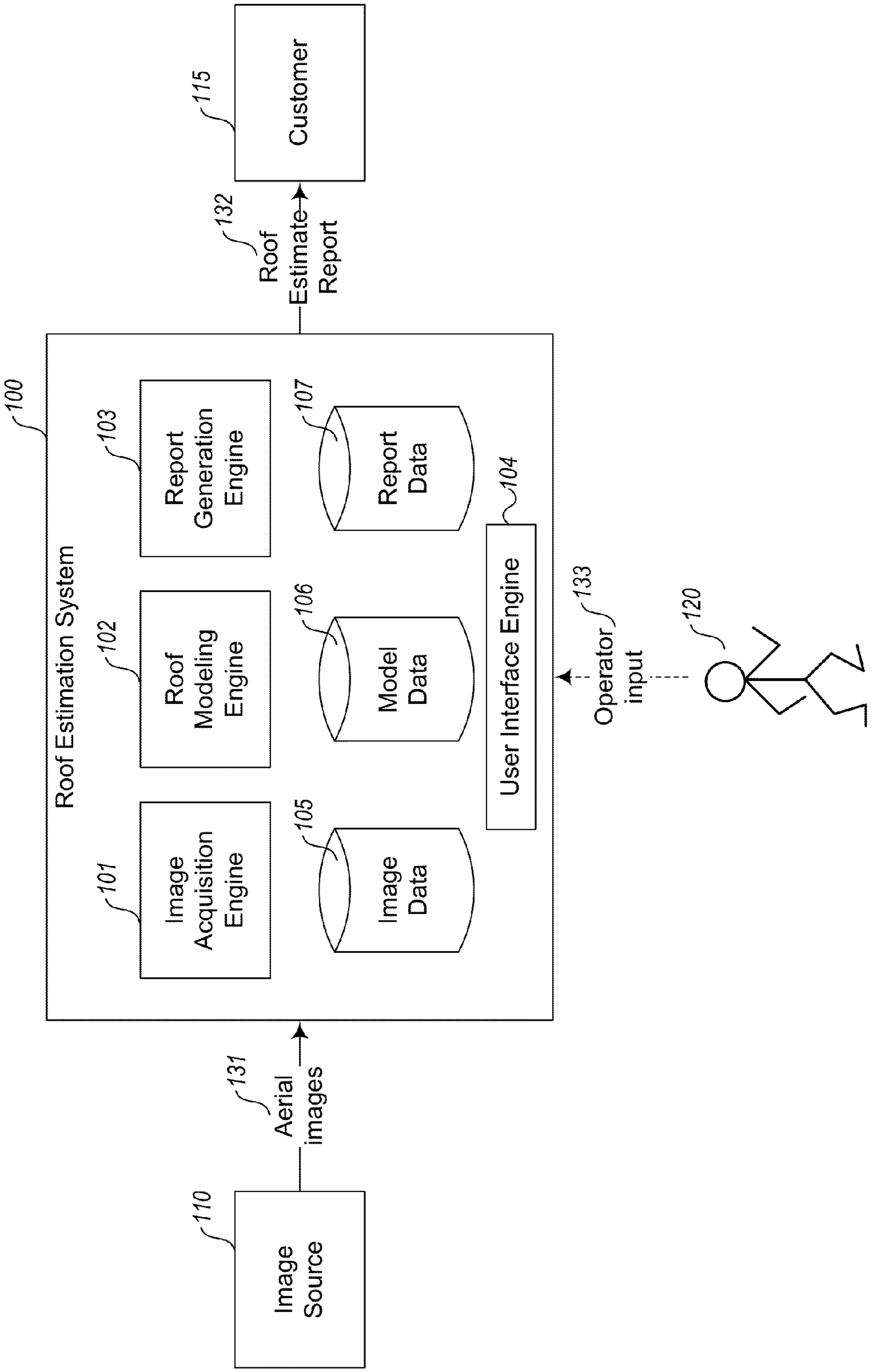
FIG. 1 is a block diagram illustrating example functional elements of one embodiment of a roof estimation system.
Figure 2A:
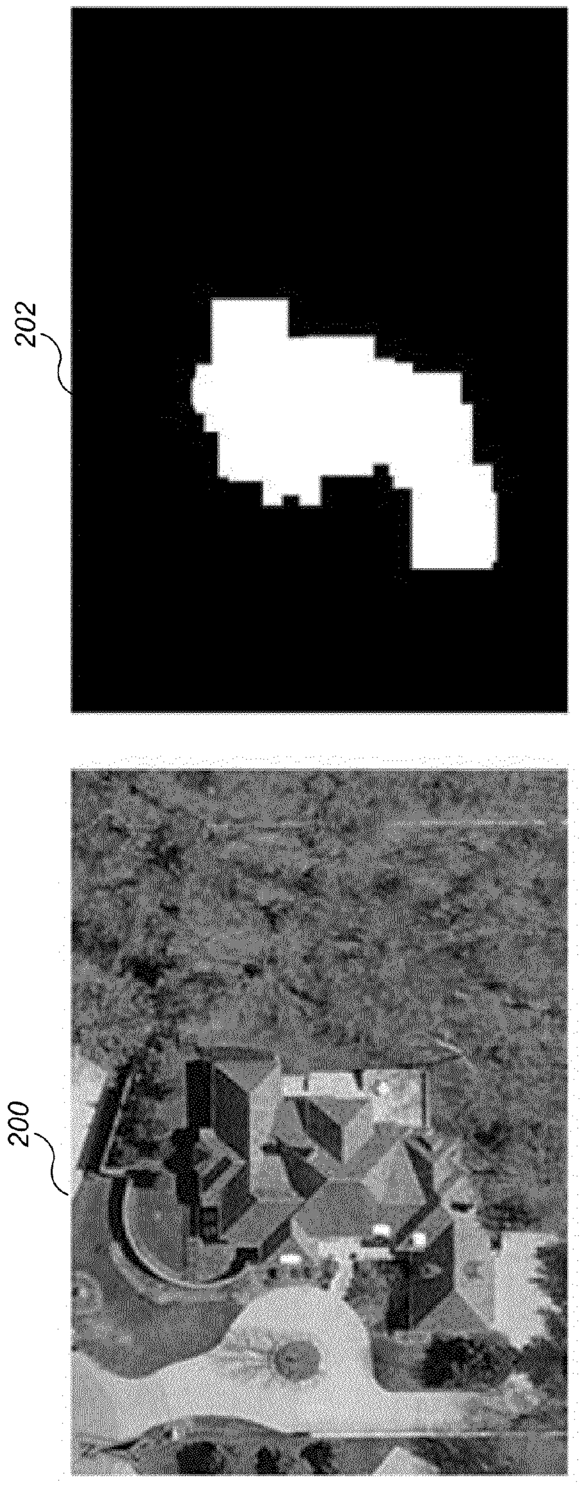
FIGS. 2A-2T illustrate aspects of automated roof detection performed by example embodiments.

In the following, FIG. 1 provides an overview of the operation of an example roof estimation system. FIGS. 2A-2T provide details related to automated roof detection. FIGS. 3A-3K provide details related to automated image registration. FIGS. 4-7 provide details related to roof estimation system implementation techniques.

1. Roof Estimation System Overview

FIG. 1 is a block diagram illustrating example functional elements of one embodiment of a roof estimation system. In particular, FIG. 1 shows an example Roof Estimation System 100 comprising an image acquisition engine 101, a roof modeling engine 102, a report generation engine 103, a user interface engine 104, image data 105, model data 106, and report data 107. The Roof Estimation System 100 is communicatively coupled to an image source 110, a customer 115, and optionally an operator 120. The Roof Estimation System 100 and its components may be implemented as part of a computing system, as will be further described with reference to FIG. 4.

More specifically, in the illustrated embodiment of FIG. 1, the Roof Estimation System 100 is configured to generate a roof estimate report 132 for a specified building, based on aerial images 131 of the building received from the image source 110. The image source 110 may be any provider of images of the building for which a roof estimate is being generated. In one embodiment, the image source 110 includes a computing system that provides access to a repository of aerial images of one or more buildings. In addition, the aerial images 131 may include images obtained via manned or unmanned aircraft (e.g., airplane, helicopter, blimp, drone, etc.), satellite, etc. Furthermore, the aerial images 131 may include images obtain via one or more ground-based platforms, such as a vehicle-mounted camera that obtains street-level images of buildings, a nearby building, a hilltop, etc. In some cases, a vehicle-mounted camera may be mounted in an elevated position, such as a boom.

The image acquisition engine 101 obtains one or more aerial images of the specified building by, for example, providing an indicator of the location of the specified building (e.g., street address, GPS coordinates, lot number, etc.) to the image source 110. In response, the image source 110 provides to the image acquisition engine 101 the one or more aerial images of the building. The image acquisition engine 101 then stores the received aerial images as image data 105, for further processing by other components of the Roof Estimation System 100. Obtaining aerial images of a specified building may include various forms of geo-coding, performed by the image acquisition engine 101 and/or the image source 110. In one embodiment, the image source geo-codes a provided street address into latitude and longitude coordinates, which are then used to look up (e.g., query a database) aerial images of the provided street address.

Next, the roof modeling engine 102 generates a model of the roof of the specified building. In the illustrated embodiment, the roof modeling engine 102 generates a three-dimensional ("3D") model, although in other embodiments, a two-dimensional (e.g., top-down roof plan) may be generated instead or in addition. Generating a model of the roof may generally include image calibration, in which the distance between two pixels on a given image is converted into a physical length. Image calibration may be performed automatically, such as based on meta-information provided along with the aerial images 131.

A variety of automatic and semi-automatic techniques may be employed to generate a model of the roof of the building. In one embodiment, the roof modeling engine 102 includes an artificial intelligence ("AI") system that performs automated roof detection by a computer system identifying building roofs or other man-made or natural features located in images. The AI system may include one or more statistical models or other data structures/arrangements that are used to assist the AI system in making decisions related to automated roof detection. The statistical models include a variety of associative networks, including associative neural networks, Bayesian networks, and the like. Additional details regarding automated roof detection are provided with reference to FIGS. 2A-2T, below.

In another embodiment, the AI system is configured to perform automatic image registration, namely a computer program that receives multiple images of the same building and correlate features from at least two of the aerial images of the building. Correlating the two or more aerial images results in the construction of a 3D volume that is consistent with the viewpoints provided by the individual images. Additional details regarding automatic image registration are provided with reference to FIGS. 3A-3K, below.

The generated model typically includes a plurality of planar roof sections that each correspond to one of the planar sections of the roof of the building. Each of the planar roof sections in the model has a number of associated dimensions and/or attributes, among them slope, area, and length of each edge of the roof section. Other information may include any information relevant to a roof builder or other entity having an interest in construction of, or installation upon, the roof. For example, the other information may include identification of valleys, ridges, rakes, eaves, or hip ridges of the roof and/or its sections; roof and/or roof section perimeter dimensions and/or outlines; measurements of step heights between different roof levels (e.g., terraces); bearing and/or orientation of each roof section; light exposure and/or shadowing patterns due to chimneys, other structures, trees, latitude, and the like; roofing material; and the like. Once a 3D model has been generated to the satisfaction of the roof modeling engine 102, the operator 120, and/or the customer 115, the generated 3D model is stored as model data 106 for further processing by the Roof Estimation System 100. In one embodiment, the generated 3D model is then stored in a quality assurance queue, from which it is reviewed and possibly corrected by a quality control operator.

The report generation engine 103 generates a final roof estimate report based on a model stored as model data 106, and then stores the generated report as report data 107. Such a report typically includes one or more plan (top-down) views of the model, annotated with numerical values for the slope, area, and/or lengths of the edges of at least some of the plurality of planar roof sections of the model of the roof. The report may also include information about total area of the roof, identification and measurement of ridges and/or valleys of the roof, and/or different elevation views rendered from the 3D model (top, side, front, etc).

In addition, in some embodiments, generating a report includes determining a cost estimate, based on specified costs, such as those of materials, labor, transportation, etc. For example, a database may contain or the customer 115 may provide indications of material and labor costs to the Roof Estimation System 100. In response, the report generation engine 103 generates a roof estimate report that includes a cost estimate, based on the costs provided by the customer 115 and the attributes of the particular roof, such as area, pitch, etc.

In one embodiment, the generated report is then provided to a customer. The generated report can be represented, for example, as an electronic file (e.g., a .pdf file) or a paper document. In the illustrated example, roof estimate report 132 is transmitted to the customer 115. The customer 115 may be or include any human, organization, or computing system that is the recipient of the roof estimate report 132. For example, the customer 115 may be a property owner, a property manager, a roof construction/repair company, a general contractor, an insurance company, a solar power panel installer, a climate control (e.g., heating, ventilation, and/or air conditioning) system installer, a roof gutter installer, an awning installer, etc. Reports may be transmitted electronically, such as via a network (e.g., as an email, Web page, Web service, remote procedure call, etc.) or by some shipping mechanism, such as the postal service, a courier service, etc.

In some embodiments, one or more of the models stored as model data 106 are provided directly to the customer or other computing system, without first being transformed into a report. For example, a model and/or roof measurement information based thereon may be exported and/or transmitted as a data file, in any suitable format, that may be consumed or otherwise utilized by some other computing system, such as a computer-aided design ("CAD") tool, a drawing program, a labor and material estimation software, a project management/estimation software, etc.

The Roof Estimation System 100 may be operated by various types of entities. In one embodiment, the Roof Estimation System 100 is operated by a roof estimation service that provides roof estimate reports to customers, such as roofing contractors, in exchange for payment. In another embodiment, the Roof Estimation System 100 is operated by a roof construction/repair company, to generate roof estimate reports that are used internally and/or provided to customers, such as property owners.

In addition, the Roof Estimation System 100 may be operated in various ways. In one embodiment, the Roof Estimation System 100 executes as a desktop computer application that is operated by the operator 120. In another embodiment, the Roof Estimation System 100 executes as a network-accessible service, such as by a Web server, that may be operated remotely by the operator 120 and/or the customer 115.

2. Automated Roof Detection

The goal of automated roof detection is to identify a region of interest in an image (photograph). Typically, the region of interest is a roof. However, the described techniques may be similarly applied to identifying other man-made or naturally occurring features, including patches of concrete, turf, water, road, clusters of trees, and the like. In addition, the described techniques can be used in conjunction with non-overhead images, such as oblique and/or street level images.

Typical images acquired by the roof estimation system are not in ideal condition for image processing. As an initial matter, the acquired images are often not the original, "cleanest" photographs—the images may contain numerous artifacts due to various processing steps such as ortho-rectification, resampling, and compression. Also, there is typically no consistency from one image to the next with respect to mean exposure, time of day lighting, time of year, contrast between roof and background, color palette, and the like.

The combined effect of image artifacts and the lack of consistency between images can be very difficult to overcome. Some approaches to feature extraction rely on assumptions and/or constraints on one or more of the aforementioned parameters. For instance, having control over the camera and lighting system, image sharpness and resolution, ad-hoc knowledge about the geometry, color, texture, or size of the target of interest provides additional context to the images that can be leveraged to help separate the object of interest from the background.

The described automated roof detection techniques do not make assumptions about any of the above factors. In particular, the described techniques identify features such as building roofs across images that vary widely in quality in all of the aforementioned parameters.

Furthermore, techniques that rely on judgments made on individual pixels may be disadvantaged because the statistical variation of properties between neighboring pixels can be significant, even in a relatively controlled environment. These statistical variations may become unmanageable in a completely uncontrolled environment that also changes from image to image.

Also, some other techniques rely on a larger kernel (e.g., processing region) to average out statistical variations across a group of pixels. These techniques can suffer in at least two ways. First, a larger kernel size blurs important boundary lines and may completely average out important features of the roof. This leads to ambiguities in roof boundaries that translate in to unacceptable error margins, particularly for purposes of generating an accurate roof estimate report that can be used by a contractor or other entity to provide an accurate estimate. Second, these techniques often depend on knowledge of the image or the environment in order to determine whether an image measurement is a member of the desired group or feature (e.g., roof or non-roof). This usually manifests itself in as a set of static or dynamic thresholds that aggregate the desired portions of the image into a region of interest. These thresholds and the rules that are required to set dynamic thresholds will not be consistent between images.

Still other techniques may purely rely on artificial intelligence algorithms to identify regions of interest after learning what to look for. Again, the nature of these methods may result in probabilistic boundaries that yield unacceptable margins of error.

To summarize, techniques that attempt to determine membership based on direct measurements of properties within the image are likely to fail if there are no controls on assumptions can be made across the population of images of interest.

The described techniques yield improved results because they do not make membership decisions based on directly measured properties of individual pixels or a kernel of pixels within an image. The described techniques train an AI system on a set of direct image measurement results that have been clustered into groups of similarity identified in an n-dimensional space. The membership for a particular unknown section or point in an image is determined by comparing the statistical "fingerprint" produced by the AI system outputs against the "fingerprint" of training samples from within the tagged region of interest.

In broad terms, automated roof detection for a target image is performed in two steps. First, the system trains a statistical model to indicate whether a specified section of an image is likely showing a roof. In a first embodiment, this training is performed based on multiple historical images for which the roof and non-roof areas are known. In a second embodiment, this training is based on an operator-specified region of interest in the target image itself. Second, the system determines a likely outline of a roof in the target image, based on whether sections of the target image are showing the roof, as determined by the trained statistical model.

FIGS. 2A-2D illustrate data sources and process sampling employed in a first embodiment trained on multiple historical images. In this embodiment, historical data including multiple images having known roof areas are used. The roof areas may be known in various ways, such as via previous human and/or machine analysis.

Figure 2B:
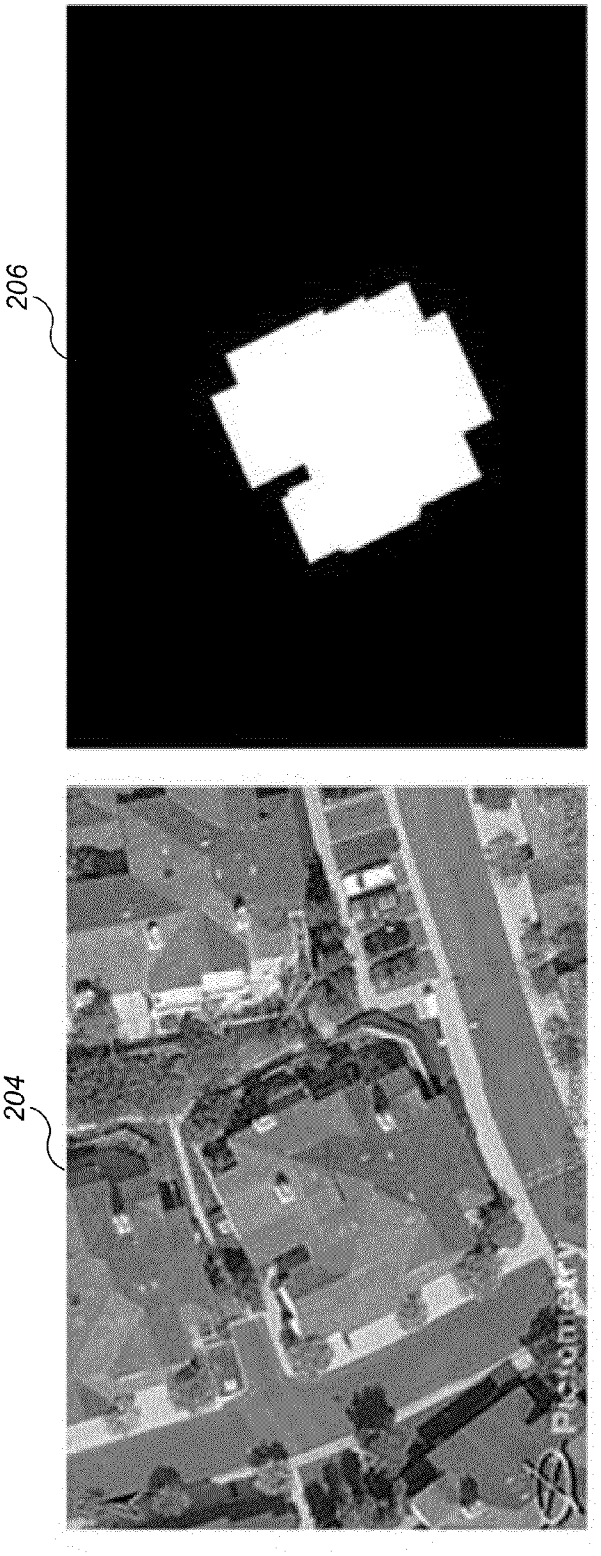

FIGS. 2A and 2B illustrate example historical data. In particular, FIG. 2A illustrates an example image 200 and a corresponding mask 202. FIG. 2B illustrates another example image 204 and a corresponding mask 206. The masks 202 and 206 indicate (in white) which sections of the image are roof areas and indicate (in black) which sections of the image are non-roof areas.

Figure 2C:
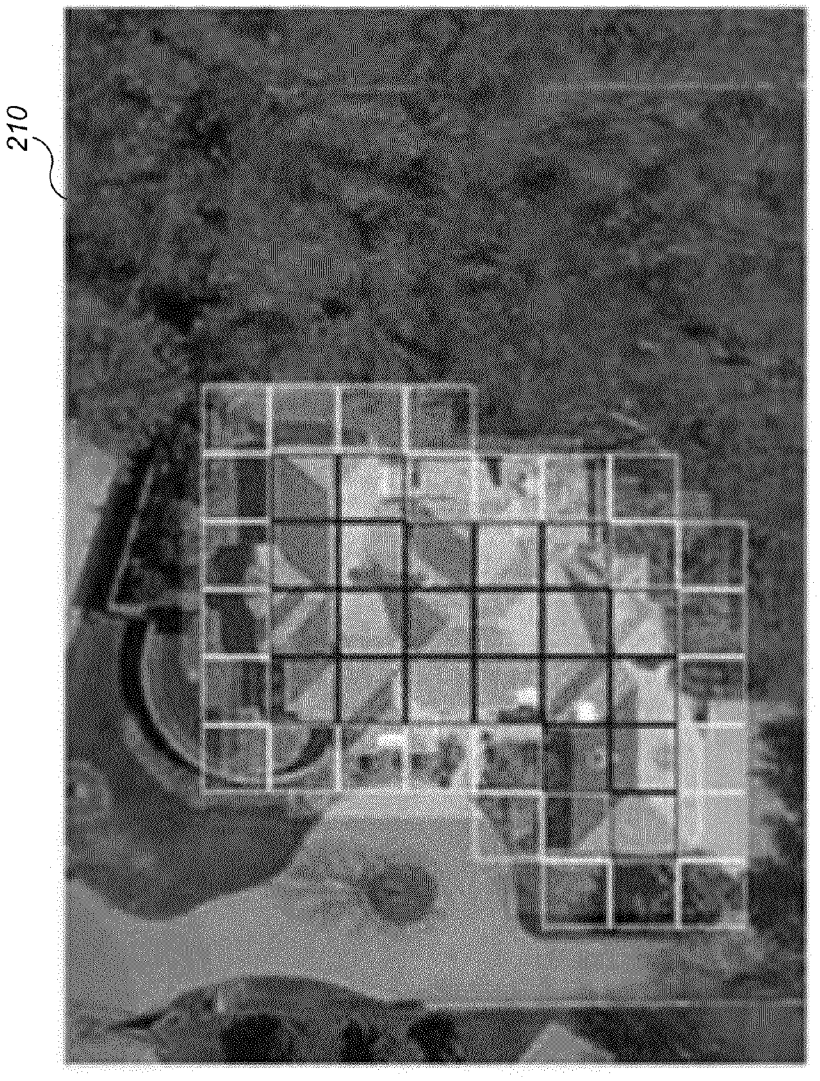
Figure 2D:
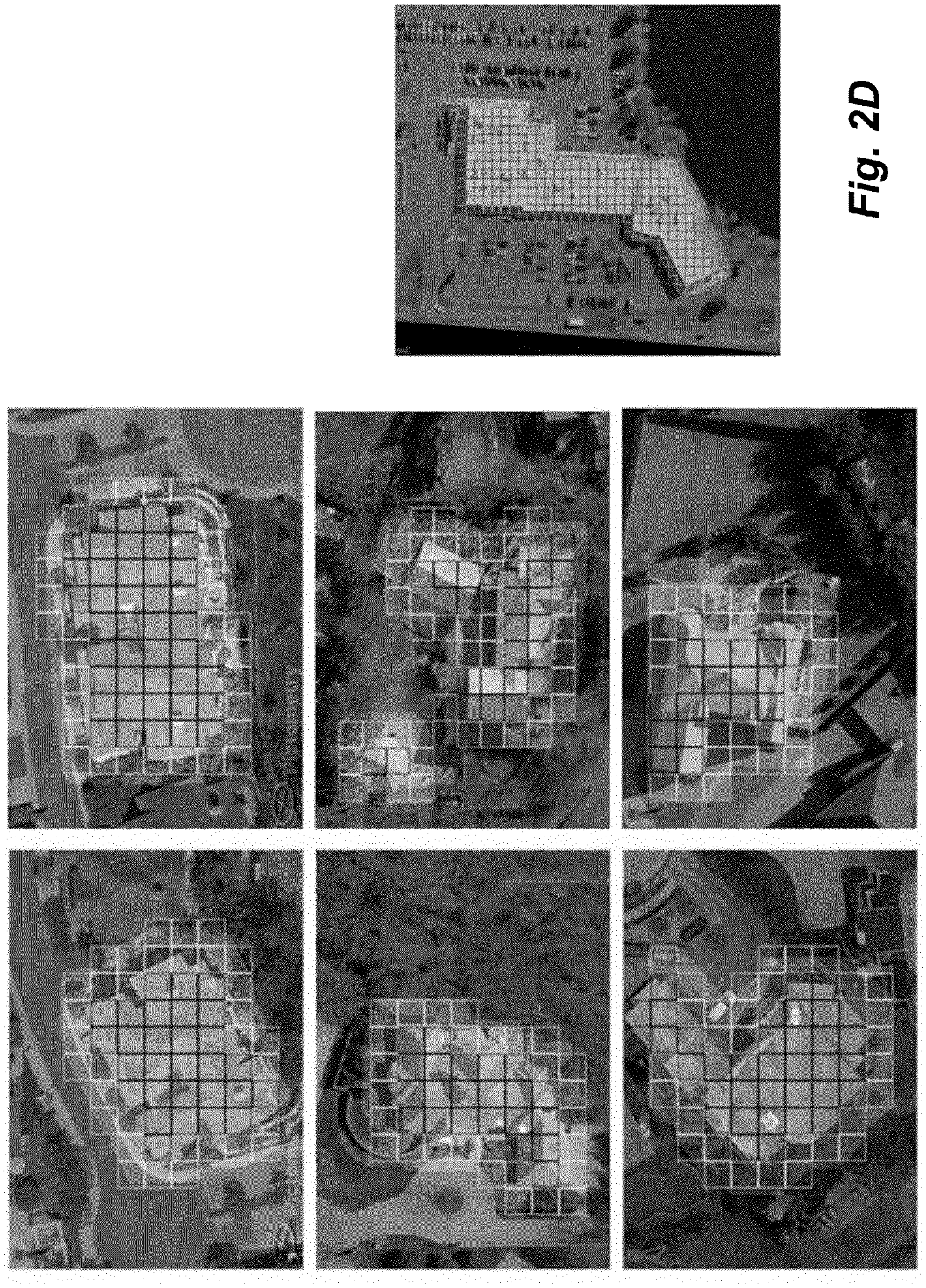

FIGS. 2C and 2D illustrate sampling techniques used during the determination of image measures. As part of the training process used in the first embodiment, each of the historical images is processed by determining, for each pixel in the image, one or more measures within a moving (N×M) sampling window about the pixel. Various measures are contemplated and are described further with respect to FIG. 2F, below. FIG. 2C illustrates an image 210 overlaid with yellow and black rectangles, each of the yellow rectangles representing that some part of the enclosed section is a non-roof area of the image 210, and each of the black rectangles representing that the entire section is a roof area of the image 210. The transition zones between yellow and black rectangles, therefore, identify roof boundaries. FIG. 2D illustrates various other example images overlaid with rectangles indicating roof and non-roof areas. The roof and non-roof areas are determined with respect to roof masks, such as those described with reference to FIGS. 2A and 2B, above. When determining image measures for image pixels, the system records the determined measures in association with whether the pixel was located in a roof or non-roof area, as determined, for example, with reference to the identified roof and non-roof areas of FIGS. 2C and 2D.

Figure 2E:

FIG. 2E illustrates data sources and process sampling employed in a second embodiment trained on data from the target image. The second embodiment is not trained on multiple historical images. Instead, the second embodiment is trained on an operator-specified region of interest within the target image. FIG. 2E illustrates an image 220 and circles 224 and 226. The circles 224 and 226 are direct-manipulation controls that can be adjusted (e.g., dragged, sized) by an operator (user) to specify a region of interest. In this example, the operator has specified two regions of the roof by way of circles 224 and 226. In other embodiments, a lesser or greater number of and shapes of portions of the roof may be specified as regions of interest. In addition, the region of interest need not be limited to a roof. For example, by selecting a portion of the driveway, the operator can cause the system to automatically determine the likely outline of the driveway, for use in generating a paving estimate report or other purpose.

Figure 2F:
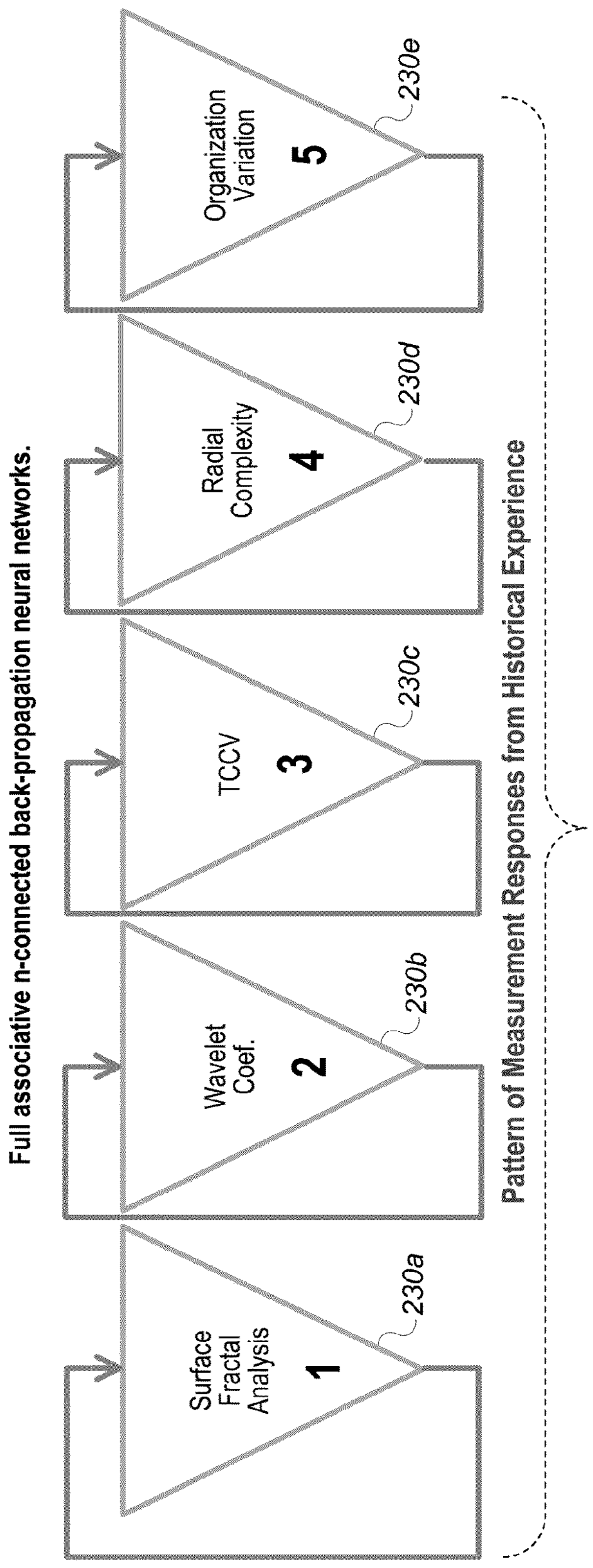
Figure 2G:
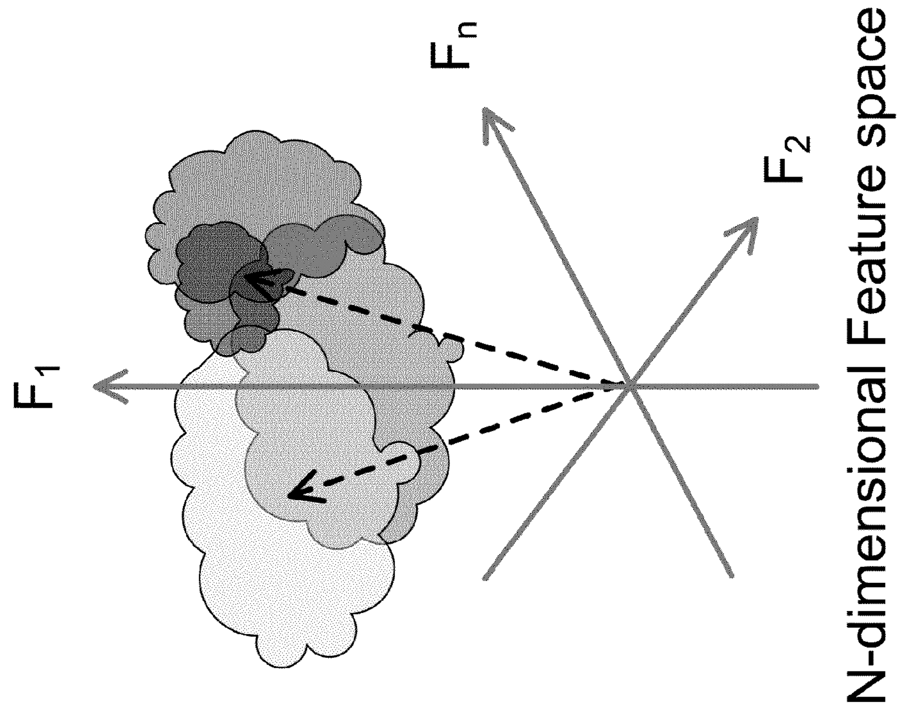
Figure 2H:
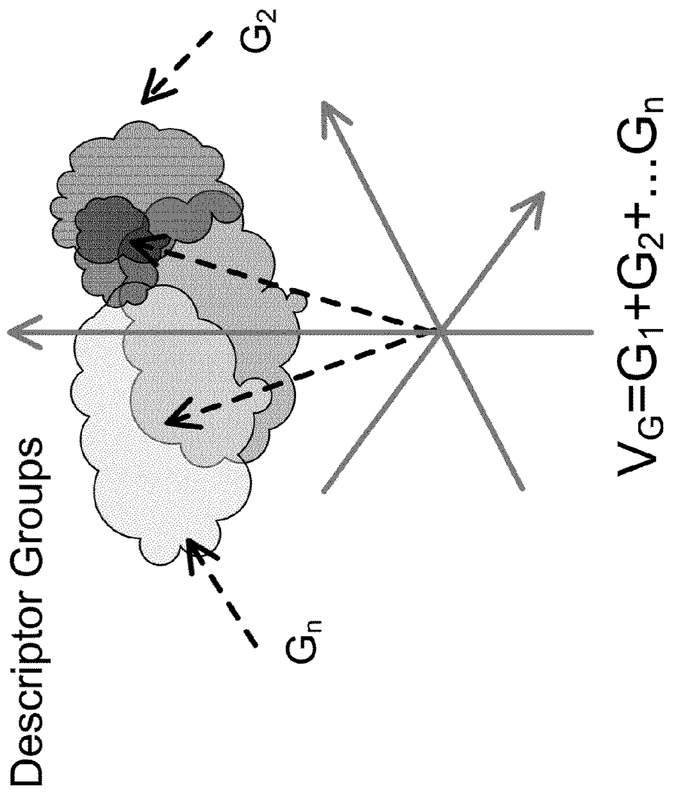
Figure 2I:
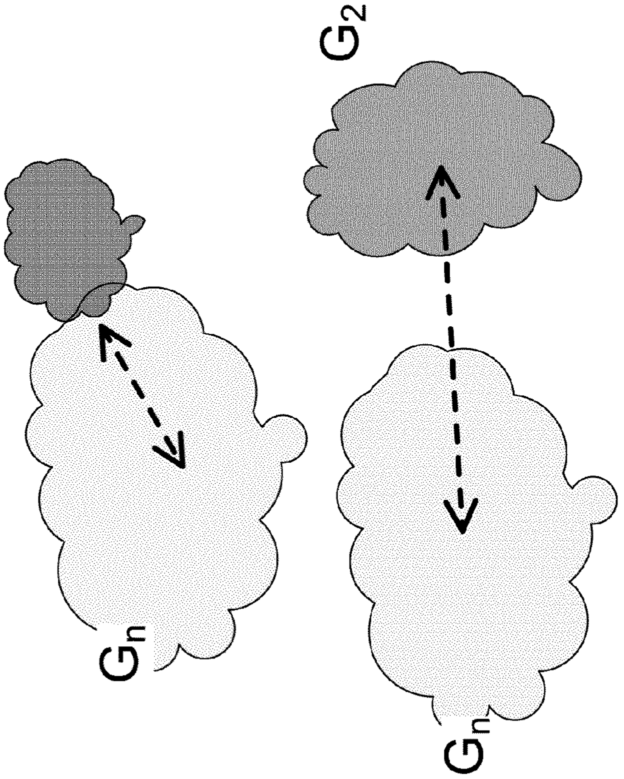
Figure 2J:
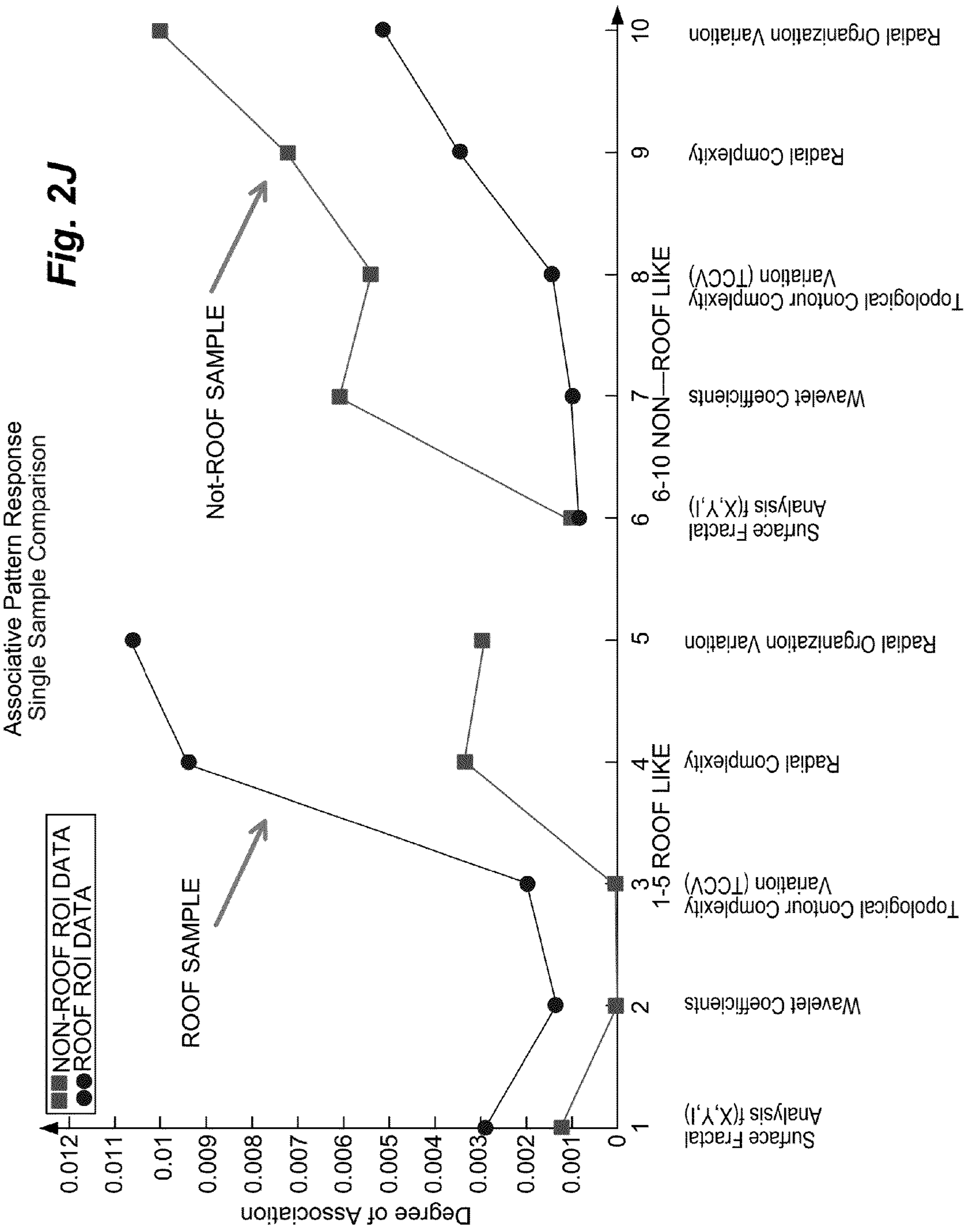
Figure 2K:
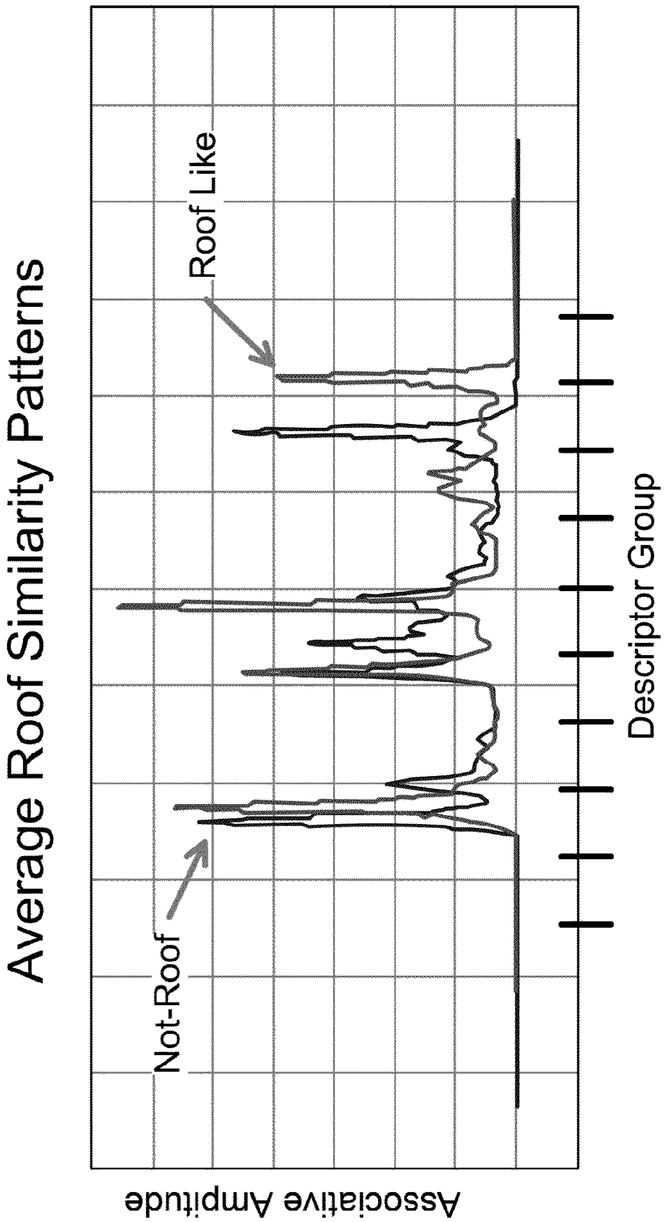
Figure 2L:
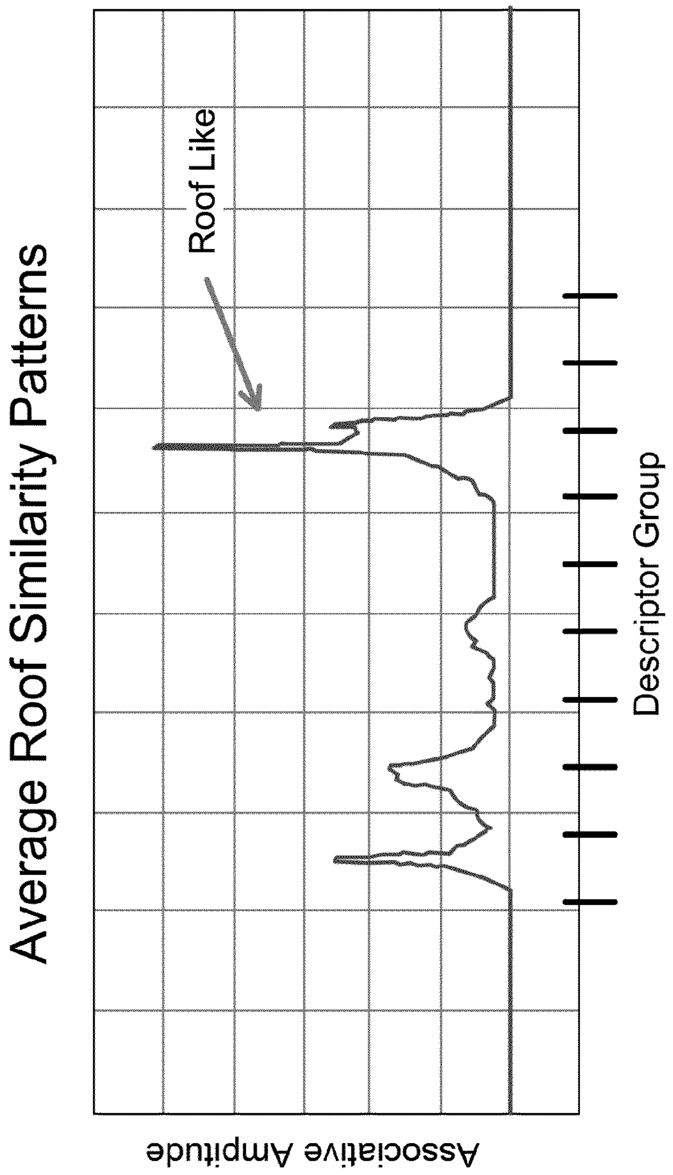
Figure 2M:
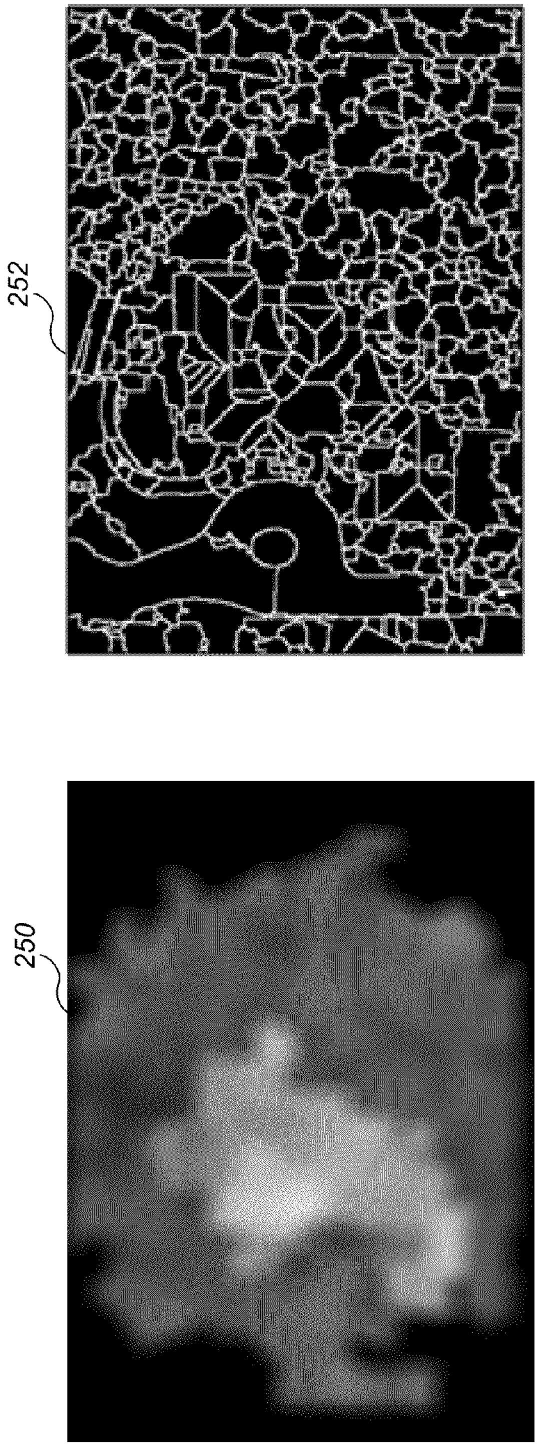
Figure 2N:
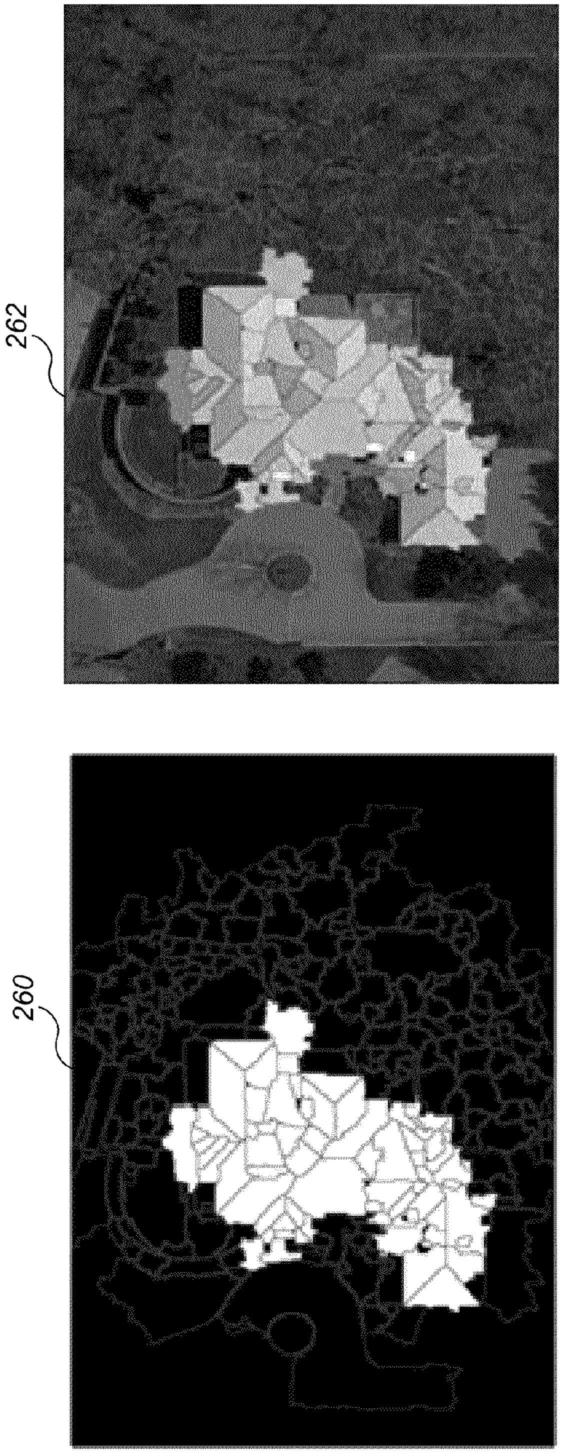
Figure 2O:
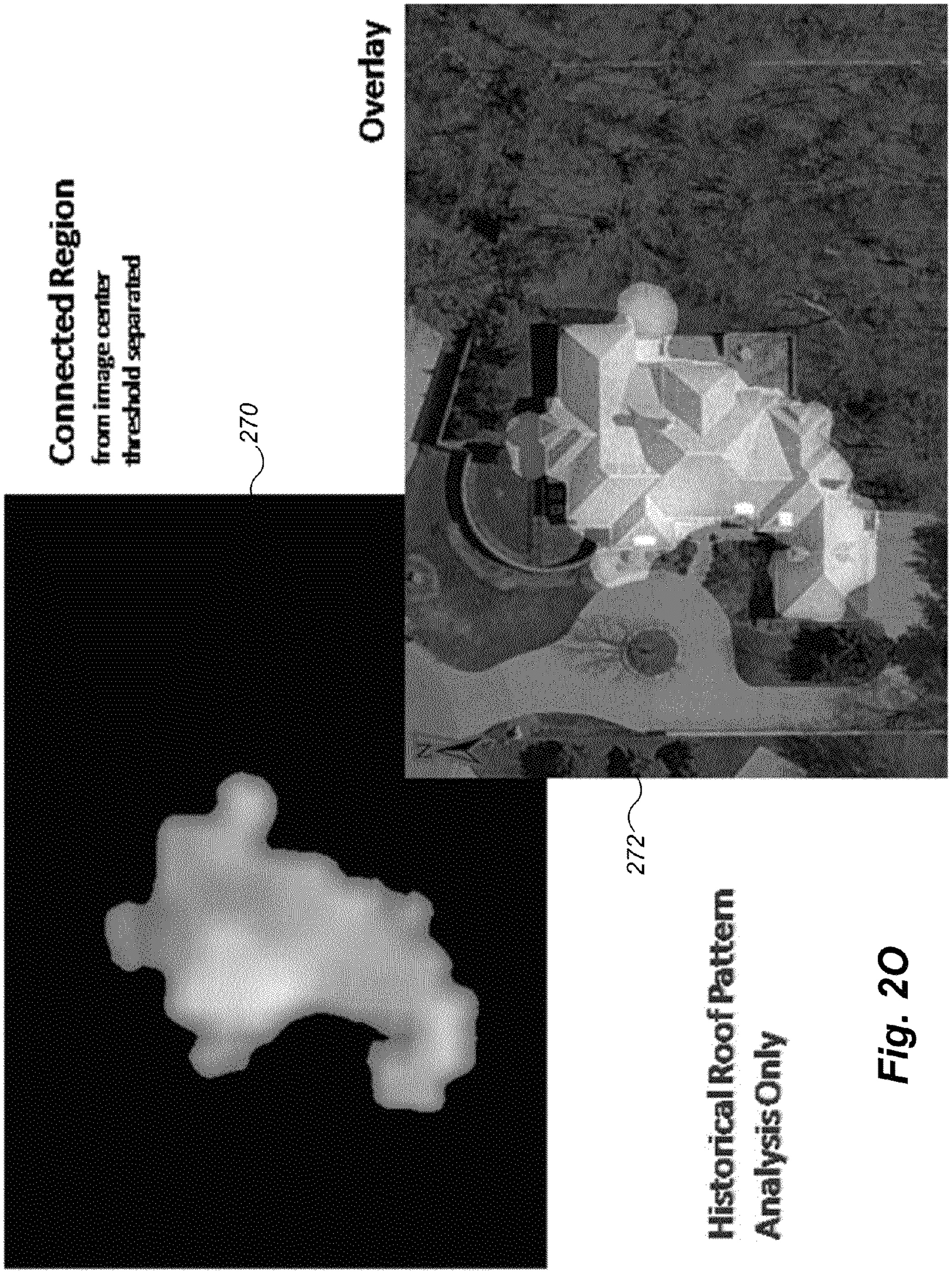
Figure 2P:
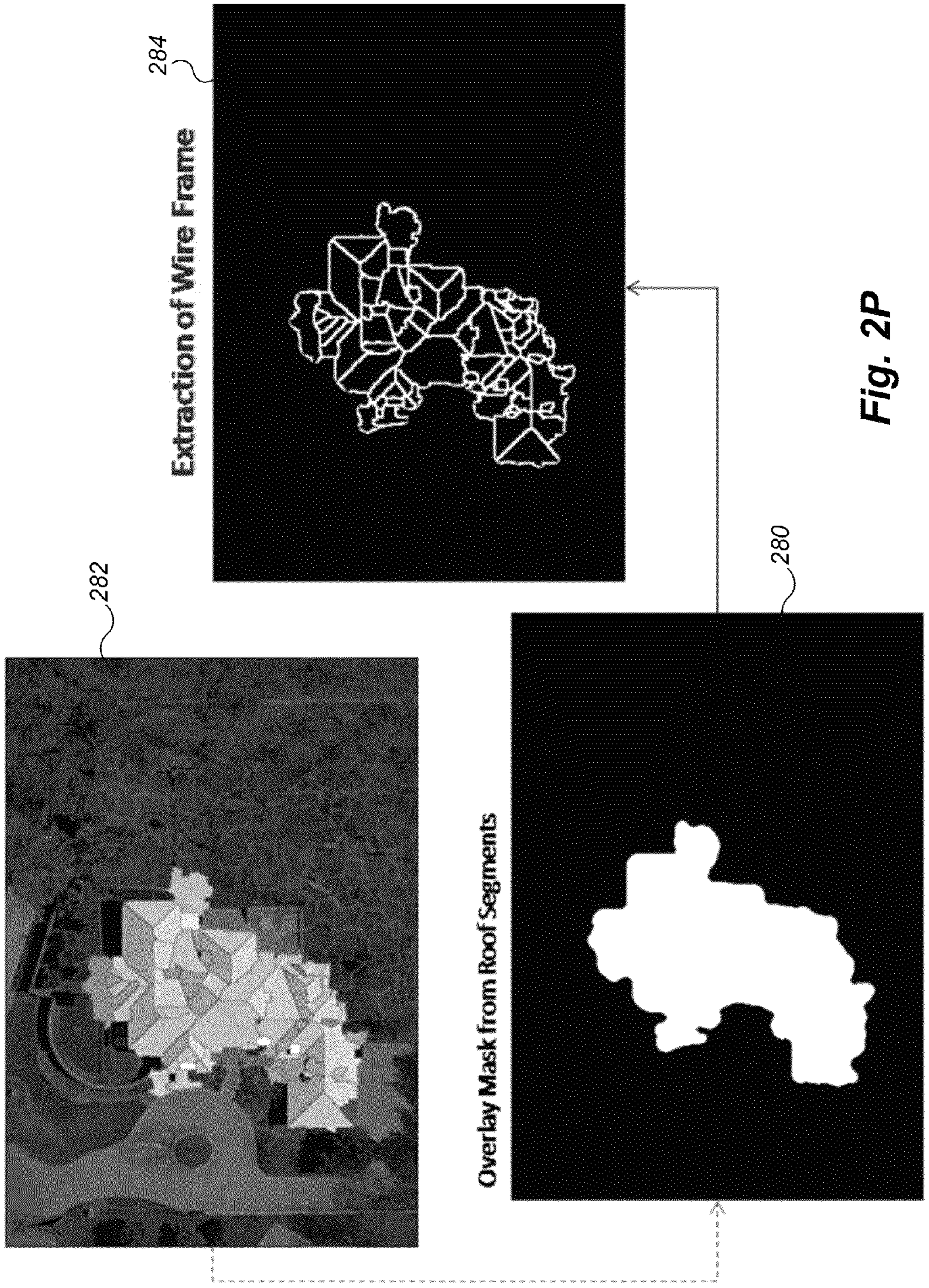
Figure 2Q:
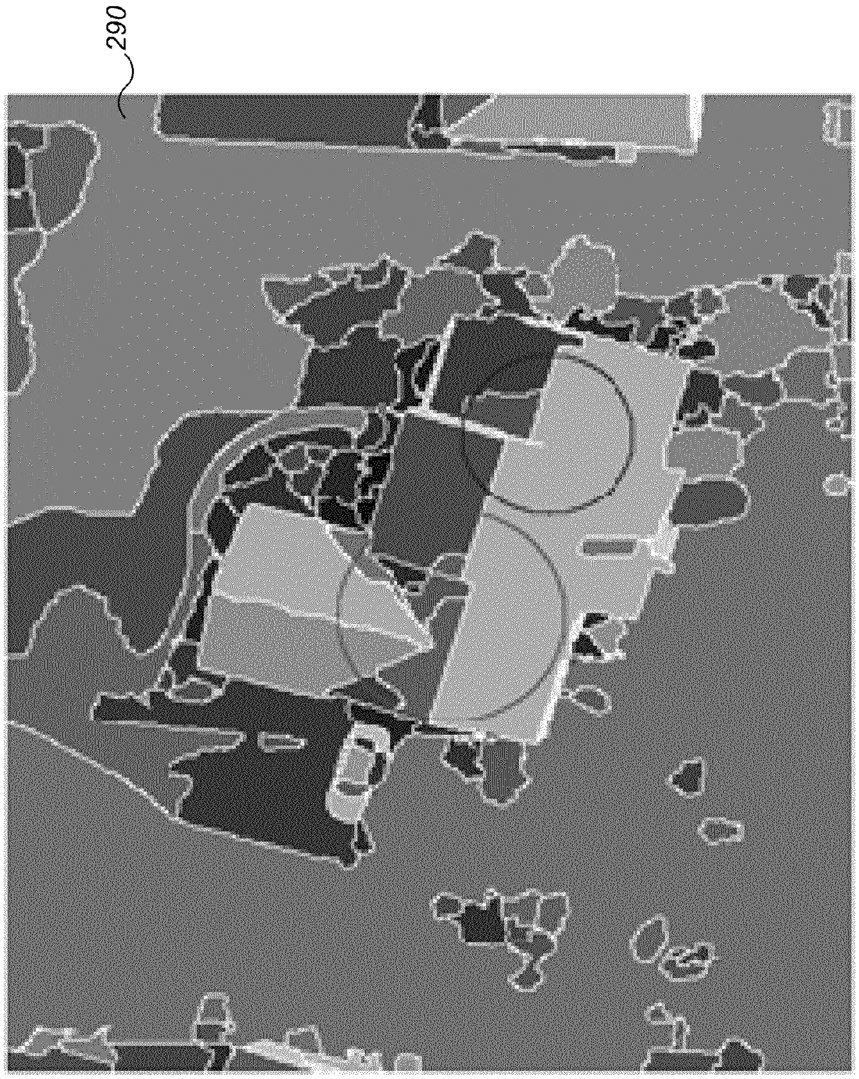
Figure 2R:

FIG. 2F illustrates example image measures (features) used during training. The image measures can be broadly classified into localized measures and neighborhood measures. Localized measures describe image textural characteristics at a particular processing point (e.g., a pixel at the center of one of the N×M sampling windows described above). Example localized measures may include surface fractal analysis, wavelet coefficients, and topological contour complexity variation (TCCV). Neighborhood measures include ranging related neighborhood measures that describe the organization of structure surrounding a particular processing point. Example neighborhood measures include radial complexity and radial organization variation. FIG. 2F depicts neural networks 230*a*-230*e* that are trained based on image measures or separable descriptor groups derived from image measures determined as described above for either the first or second embodiment. Each of the neural networks 230*a*-230*e* is a full associative n-connected back-propagation neural network. Neural networks 230*a*-230*e* are respectively trained either on direct measures (such as a surface fractal analysis measure, a wavelet coefficient measure, a topological contour complexity variation (TCCV) measure, a radial complexity measure, and a radial organization variation measure) or on separable descriptor groups (clusters) derived from statistical analysis of the aforementioned measures, as described with respect to FIGS. 2G-2L, below.

Figure 2S:
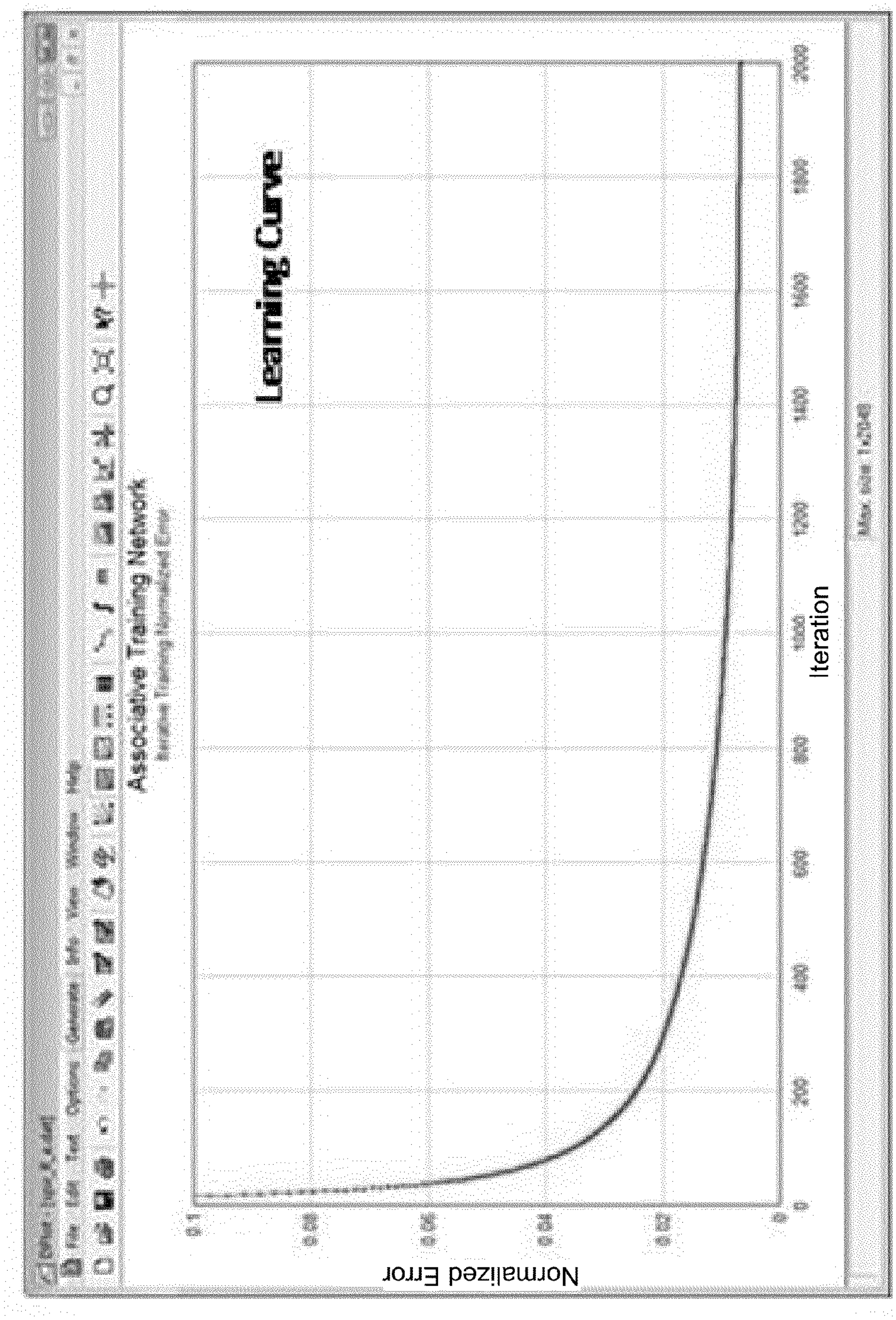
Figure 2T:
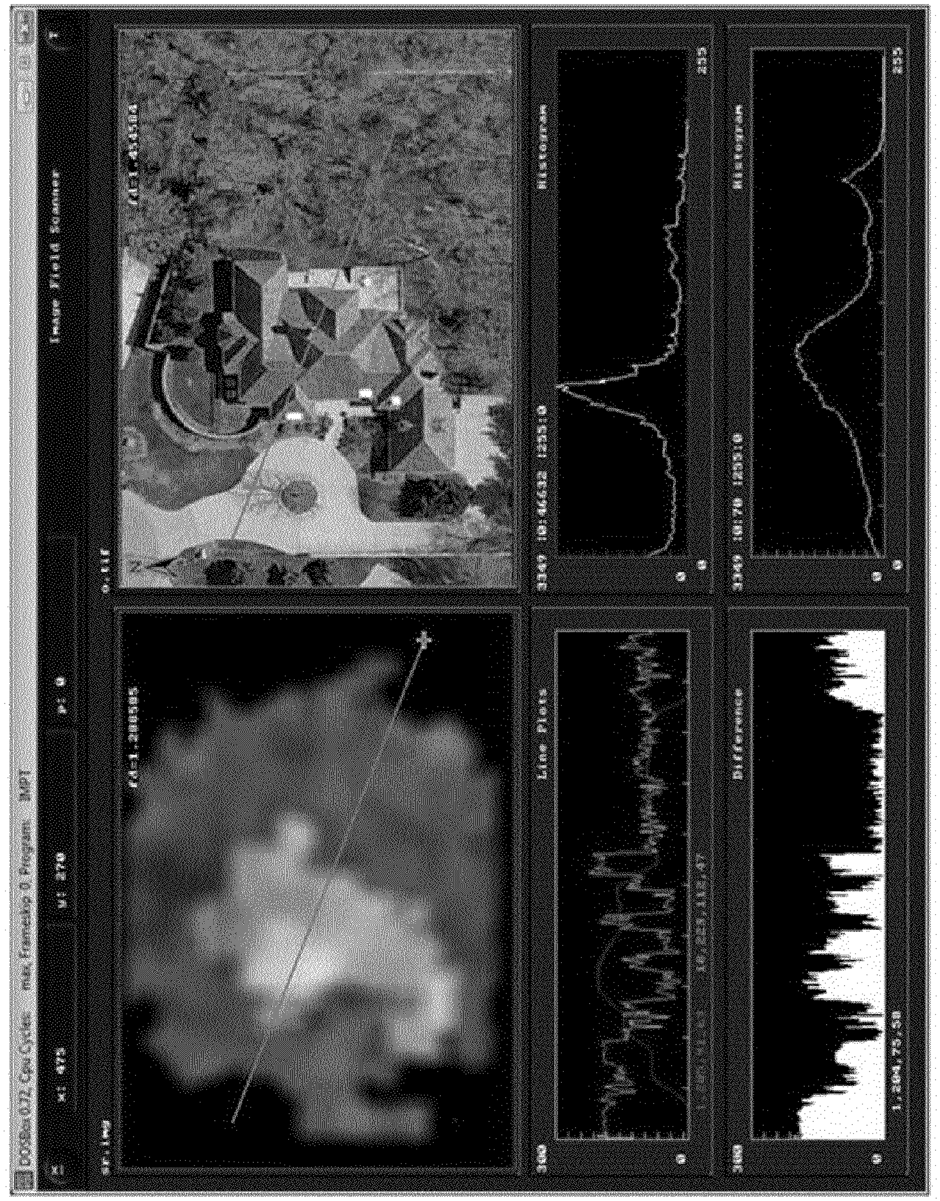

FIG. 2S is a graph of the learning curve exhibited by an example neural network used in the first embodiment. The graph plots training iteration (x-axis) against normalized error (y-axis).

FIGS. 2G-2I illustrate the process of determining group descriptor patterns that are used to identify roof or non-roof areas of an image. Group descriptor patterns are determined in the following manner. First, image measures are taken for training data (either historical images or from the operator-specified region of interest). Those image measures can be represented as a "cloud" in an n-dimensional feature space, as shown in FIG. 2G, where the value of each pixel (or other processing unit) is a vector comprising the values determined for each of the measures calculated for that pixel.

Then, a feature transformation is performed, wherein image measures are statistically analyzed using clustering techniques to group the data into separable descriptor groups (clusters), as shown in FIG. 2H. The number of descriptor groups is not necessarily the same as the number of measures. For example, if five measures are used (as shown in FIG. 2F), a smaller number (e.g., three) descriptor groups may be determined. The descriptor groups together form a new feature vector that includes any error and uncertainty (e.g., due to changing image quality) of the measurements folded into a space describing the average statistical value at a roof (or non-roof) point.

Next, as shown in FIG. 2I, each descriptor group is compared to each other descriptor group, using a statistical model such as an associative neural network, to create a group descriptor pattern of inter-relational characteristics. As discussed below, these group descriptor patterns serve as the basis for identifying image features, such as roofs, non-roofs, vegetation, cement patios not covered, decks, or the like. A deck, which is adjacent a home and not covered by a roof, can also be identified as not part of the roof.

FIGS. 2J-2L illustrate generation of average group descriptor patterns from multiple group descriptor patterns. An average group descriptor pattern can serve as a fingerprint that can be associated with particular features in the image, such as roofs, non-roofs, vegetation, pavement, decks, or the like. FIGS. 2J and 2K illustrate the generation of average group descriptor patterns in the first embodiment. In the first embodiment, average group descriptor patterns are generated as follows. For all of the known roof masks in the historical image data, measures on the roof and non-roof areas are analyzed and an average group descriptor pattern is generated and cross correlated within the AI system, creating a roof like pattern and a non-roof like pattern templates that may be used to determine which regions of an image are more likely to be roof or non-roof areas. The trained neural networks describe the average descriptor pattern for roofs and the average descriptor patterns for non-roofs, as represented within the historical data. FIG. 2J shows example roof like and non-roof like patterns in the first embodiment. FIG. 2K shows another example of roof like (in red) and non-roof like (in blue) patterns in a graph of descriptor group versus associative amplitude. The examples of FIGS. 2J and 2K show that particular descriptor groups are more highly associated with roofs (or non-roofs) than other descriptor groups.

In the second embodiment, average group descriptor patterns are generated as follows. For all the points under the operator specified regions of interest (typically a portion of the roof) in the target image, measures within the regions of interest are analyzed and an average group descriptor pattern is generated and cross correlated using an associative neural network, creating a single roof like pattern template that may be used to determine which regions of an image are likely to be roof areas. The trained neural networks describe the average descriptor pattern for a roof of the type specified within the operator specified regions of interest in the target image.

FIGS. 2M-2P illustrate roof detection in a first embodiment trained on historical data. In the first embodiment, a roof in a target image is detected based on the above-described training as follows. For every point across the target image, the probability of a point being on the roof is is generated by comparing the measured descriptor group pattern at each point to the average trained/learned pattern for the historical response. This probability intensity value is weighted by assessing how much it is similar to a roof and how much it is similar to the learned non-roof pattern. Image 250 of FIG. 2M represents (in terms of brightness) the likelihood that a point of image 200 (FIG. 2A) is on the roof. In FIG. 2M, the image itself is very fuzzy, but one factor in this step is the brightness of the respective pixel, not the sharpness of a boundary for a group of pixels Next, the target image is segmented using a watershed technique that separates the target image into segments based on boundary gradient amplitudes. The segments are determined based on contrast differences within the target image. Image 252 of FIG. 2M represents the watershed segmentation performed upon image 200 (FIG. 2A).

Then, in a radial fashion expanding outward from the center of the target image, each watershed segment is overlaid on top of the probability mapping and the total average probability that the segment is roof like is computed. If the calculated probability passes acceptable amplitude criteria, the watershed segment is defined as being part of the roof. Image 260 of FIG. 2N shows the watershed segments overlaid on top of the probability mapping shown in image 250 (FIG. 2M). Image 262 of FIG. 2N shows the determined roof segments overlaid on top of the original target image 200.

FIG. 2O shows another view of automatic roof detection performed by the first embodiment. In particular, FIG. 2O shows a side-by-side view of a mask 270 and image 272. Mask 270 represents the automatically detected roof. Image 272 depicts the mask 270 representing the automatically detected roof overlaid on top of image 200.

FIG. 2P shows another view of automatic roof detection performed by the first embodiment. In particular, FIG. 2P shows a mask 280 generated from the result of a probability mapping performed with reference to a trained AI system. FIG. 2P further shows an image 282 comprising the original image 200 overlaid with the watershed segmentation (red lines) and filled with white according to whether the segments sufficiently intersect the mask 280. FIG. 2P also shows a mask 284 detailing the watershed segments bounded by the roof mask 280. The mask 284 can serve as a wire frame representation of the detected roof.

FIG. 2T shows another view of automatic roof detection performed by the first embodiment. In particular, FIG. 2T shows a side-by-side view of the roof selected with the assistance of an associative neural network (left) and the original image (right).

FIGS. 2Q-2R illustrate roof detection in a second embodiment trained on data from the target image. In the second embodiment, a roof in a target image is detected based on the above-described training as follows. First, the target image is segmented using a modified Edison (edge detection and image segmentation) mean shift based/synergistic segmentation procedure to break an image into regions based on textural content, similarity, size and local association. FIG. 2Q shows an image 290 representing pre-segmentation of the target image 220 (FIG. 2E).

Then, for each segment of the target image, the overall descriptor group pattern for the points within the segment is computed. The computed group descriptor pattern is then compared to the training of the area or areas under the operator-specified regions of interest in order to define a single similarity probability measure. The similarity probability indicates a degree of similarity to the region or regions of interest. Image 292 of FIG. 2R represents the similarity probability of the segments shown in image 290, with the green-colored segments being highly similar to the regions of interest, and the red-colored segments being dissimilar to the regions of interest.

Next, regions of majority similarity to the regions of interest are retained as part of the roof, and all others are eliminated from consideration. Image 294 of FIG. 2R represents the end result of automatic roof detection performed by the second embodiment. In particular, in image 294, the color blue indicates detected roof segments, and the color green indicates non-roof segments.

Although the above techniques are described in the context of a first embodiment trained on historical image data and a second embodiment trained on data from the target image, other arrangements are contemplated. For example, embodiments need not use the specific segmentation techniques described above. For example, the first embodiment could instead use the Edison-style segmentation described with respect to the second embodiment. Other segmentation, edge-, or region-detection techniques may be similarly employed.

Furthermore, in an embodiment that is trained on an operator-specified region of interest, the region of interest need not be on the target image itself. Instead, the region of interest could be on another image that is similar in some way to the target image. In one example embodiment, multiple target images are automatically grouped based on image characteristics (e.g., average contrast, brightness, color-histogram, or the like). Then, for each of these groups, an exemplar image is selected (e.g., by random, by the operator, or the like) and used by the operator to specify a region of interest to use for training purposes. Next, the AI system is trained on the region of interest from the exemplar image. Then, for each of the images in the group, a roof is detected based on the trained AI system.

In addition, other features besides roofs can be detected. In particular, by specifying a different region of interest, the AI system will be automatically configured to identify image areas that are similar to the specified region. For example, by specifying an area of lawn as a region of interest, sections of lawn could be detected for purposes of estimating a quantity of sod required to cover a particular property. In one embodiment, such techniques can be used to automatically measure ground coverage over urban or suburban areas, so as to track the growth or decline of vegetation (e.g., tree) coverage, non-permeable surface (e.g., pavement) coverage, and the like.

3. Automated Image Registration

The goal of computer driven image registration is to correlate information contained in multiple viewpoints of a structure. This correlation results in the construction of a 3D volume consistent with the viewpoints provided by the individual images. The computer programs thus provide an automated image registration, namely, without the use of human skill and judgment to create the results.

Figure 3A:
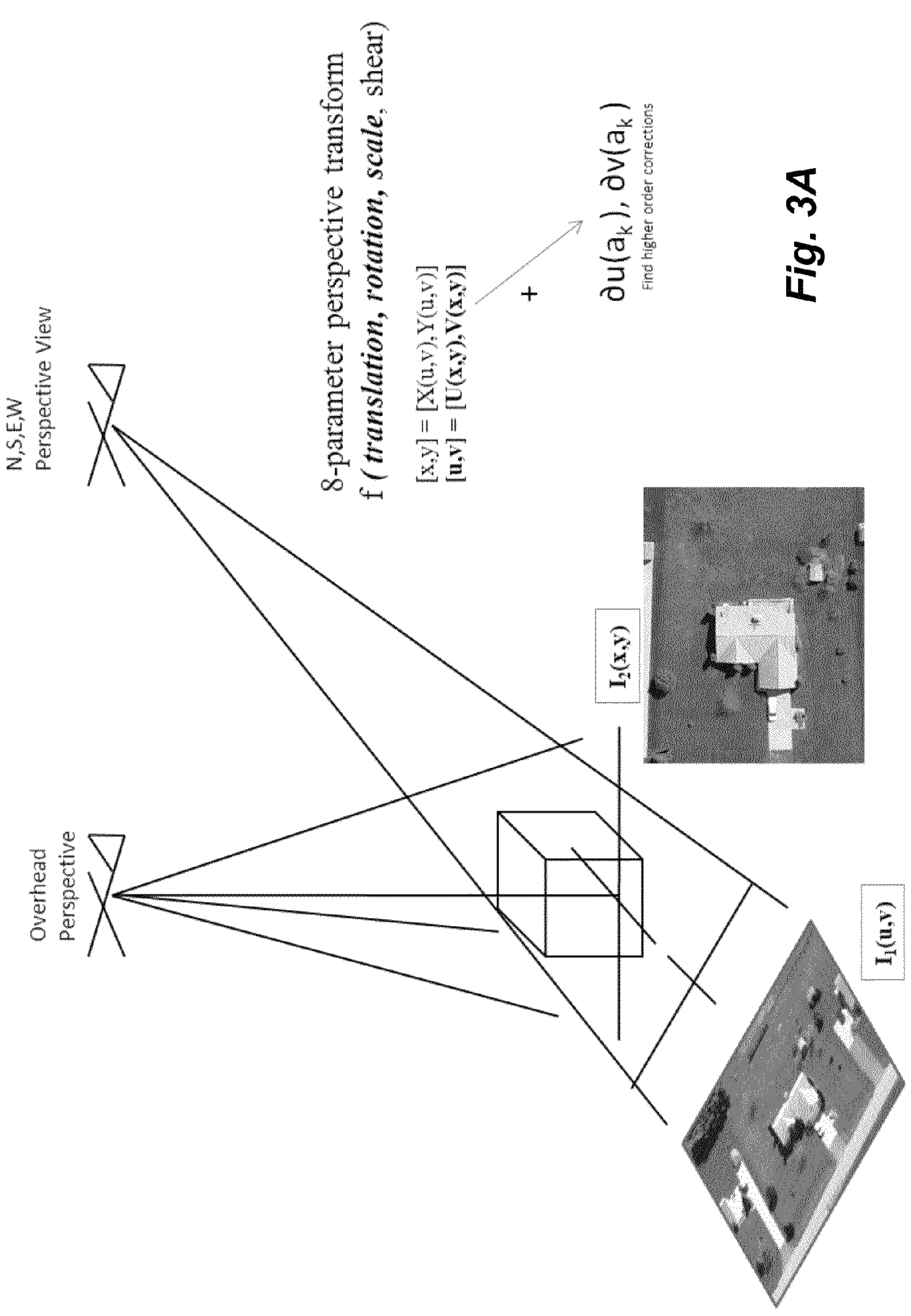
FIGS. 3A-3K illustrate aspects of automated image registration performed by example embodiments.

FIG. 3A depicts a virtual volume resulting from automated image registration applied to a set of 2D photographs (images) of the same object. The images include an overhead view and one or more perspective views.

Automated image registration includes minimizing an error (cost) function associated with a projection of one image into a second image. Reduction of this error function establishes the change in the observer's viewpoint around a virtual 3D space that produced the two viewpoints seen in the images. In particular, the process determines transform parameters using non-linear least-squares optimization. The process uses the sum of squared differences (SSD) as the objective criterion that defines similarity measure between 2 images, normalized 0-1.0, as defined in the following:

$$\chi^2(a) = \int_{uC}^{uC}\int_{R^2}^{R^2}(I_1(u) - I_{2'}(u))^2\,du$$
$$= \int^{uC}\int^{R^2}(I_1(u) - T_A\{I_2(x)\})^2\,du$$
$$= \|I_1(u) - T_A\{I_2(x)\}\|^2$$

The process uses a model defined as:

$T_A$ {$a_k$: translation, rotation, scale, shear}

$\chi^2(a)=\Sigma[I_1(u_i)-I_2'(u_i)]^2$ $=\Sigma[I_1(u_i)-T_A\{I_2(x_i)\}]^2$ with T being a geometric transform applied on an overhead image $I_2$ to map its [x,y] coordinate system to the [u,v] coordinate system of a prospective N,S,E,W $I_1$ view.

The minimum in the gradient of the SSD as a function of the transform parameters is the optimal solution. This occurs when the derivative of the function vanishes to zero:

$B_k(a)=\partial\chi^2(a)/\partial a_k=-2\Sigma[I_1(u_i)-I_2'(u_i)]\partial I_2'(u_i)/\partial a_k=0$ For $a_k$=1, 2, 3, . . . 8, the process generates a system of eight nonlinear equations with eight unknowns.

Figure 3B:
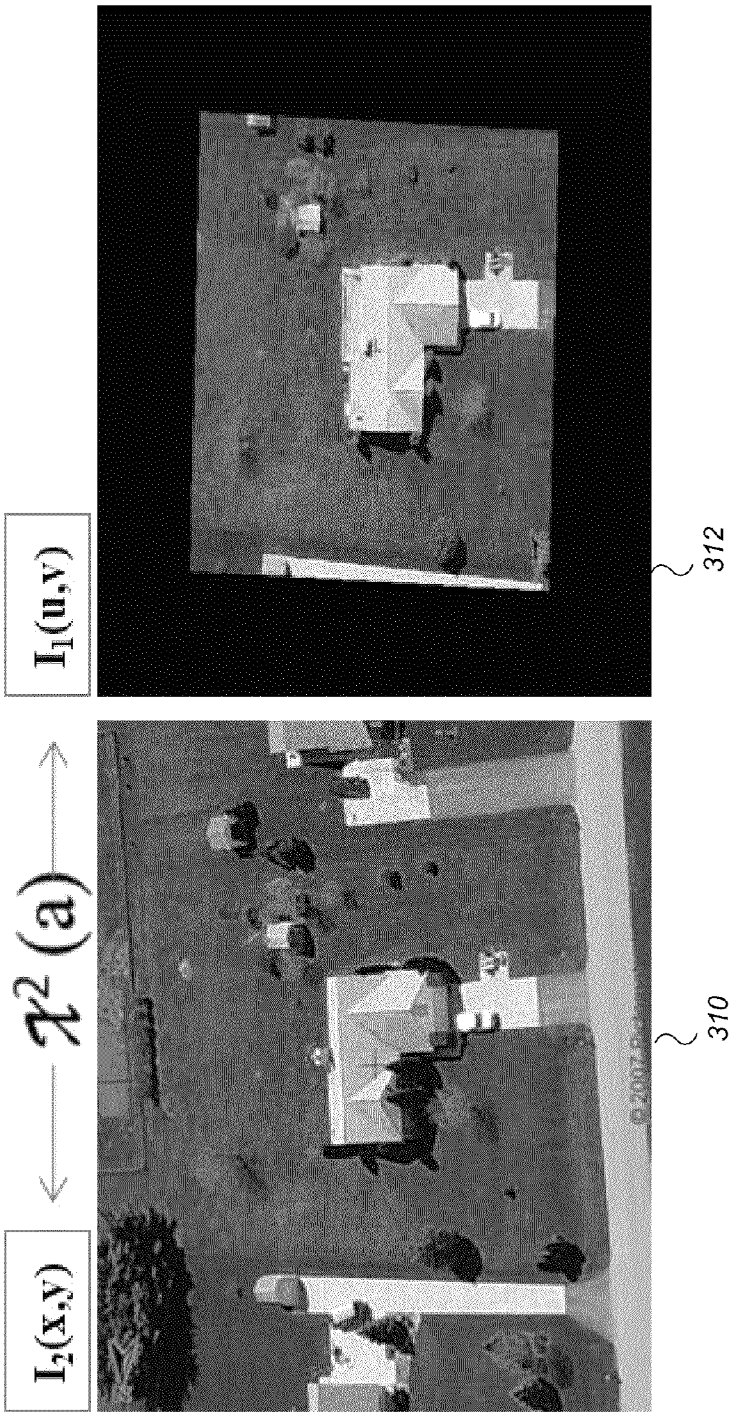

FIG. 3B shows example images 310 and 312. Images 310 and 312 are taken from different orientations. The automated registration process seeks to map (project) image 310 onto 312.

Figure 3C:
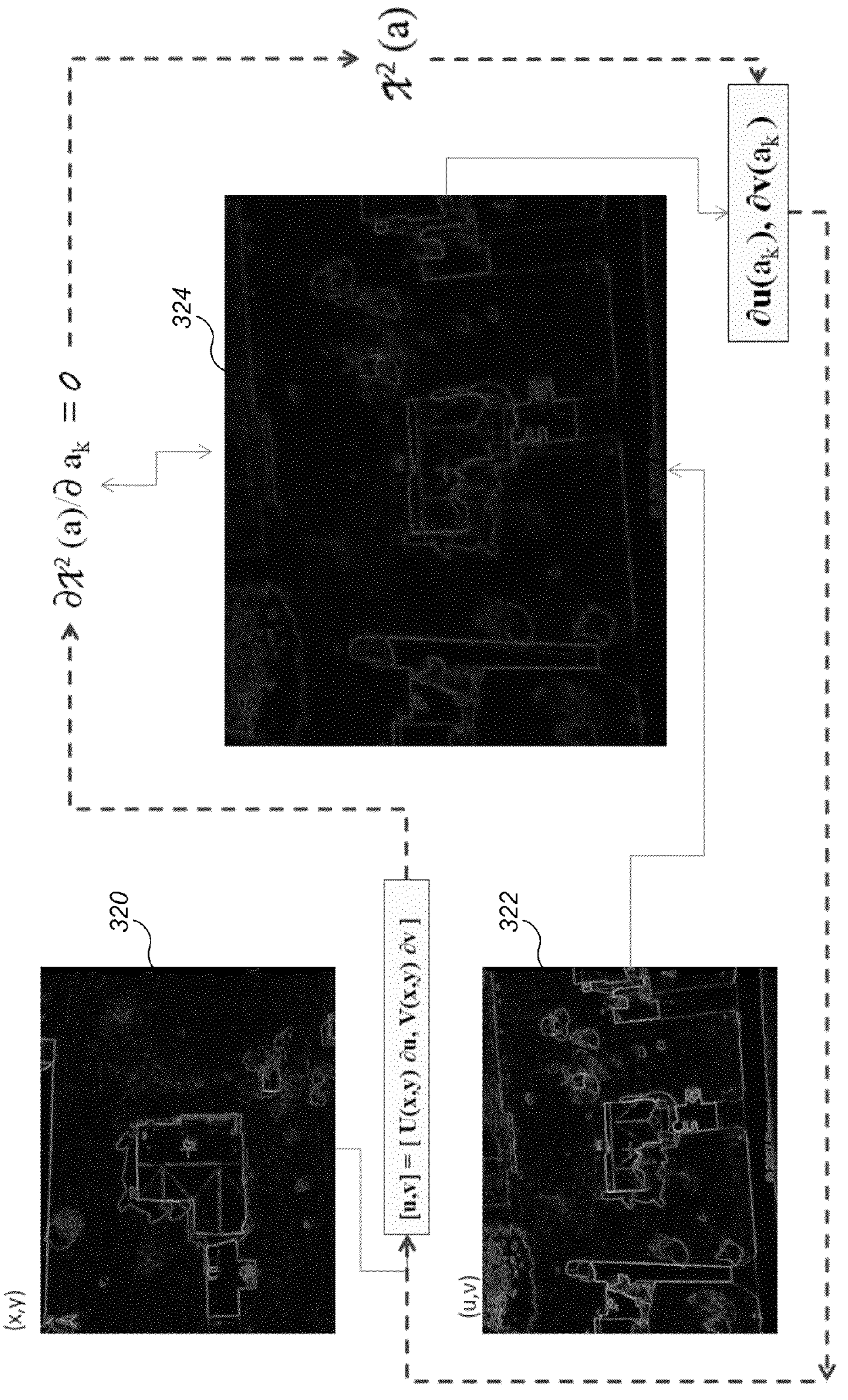

FIG. 3C illustrates an iterative approach to mapping one image 320 onto another image 322, and determining the change in the associated error function, represented as image 324.

Figure 3D:
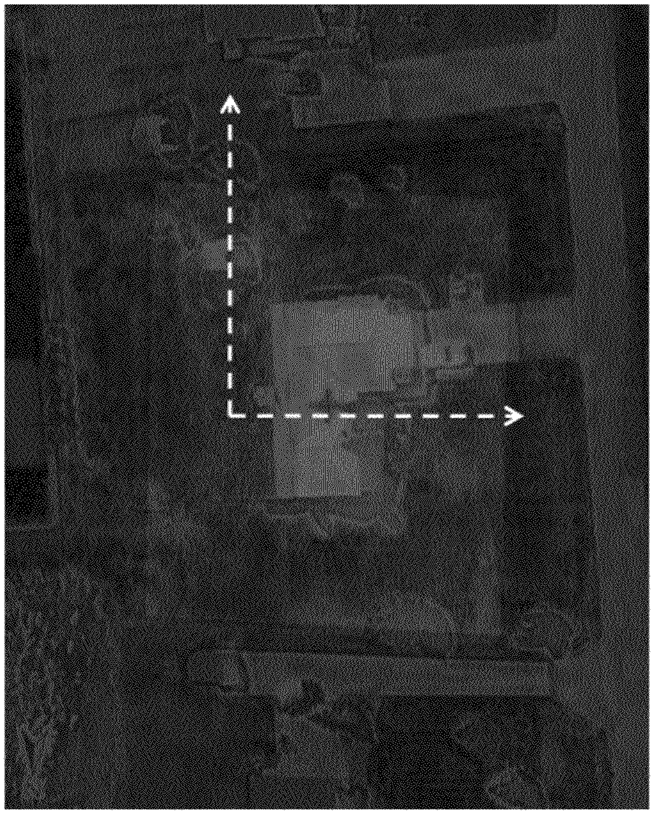

FIG. 3D illustrates the seven degrees of freedom that are iterated over when searching for a reduced or minimal value of the error function. The seven degrees of freedom include translation in three dimensions (Tx, Ty, Tz), rotation (Rx, Ry, and Rz), and scale (Sc).

Figure 3E:
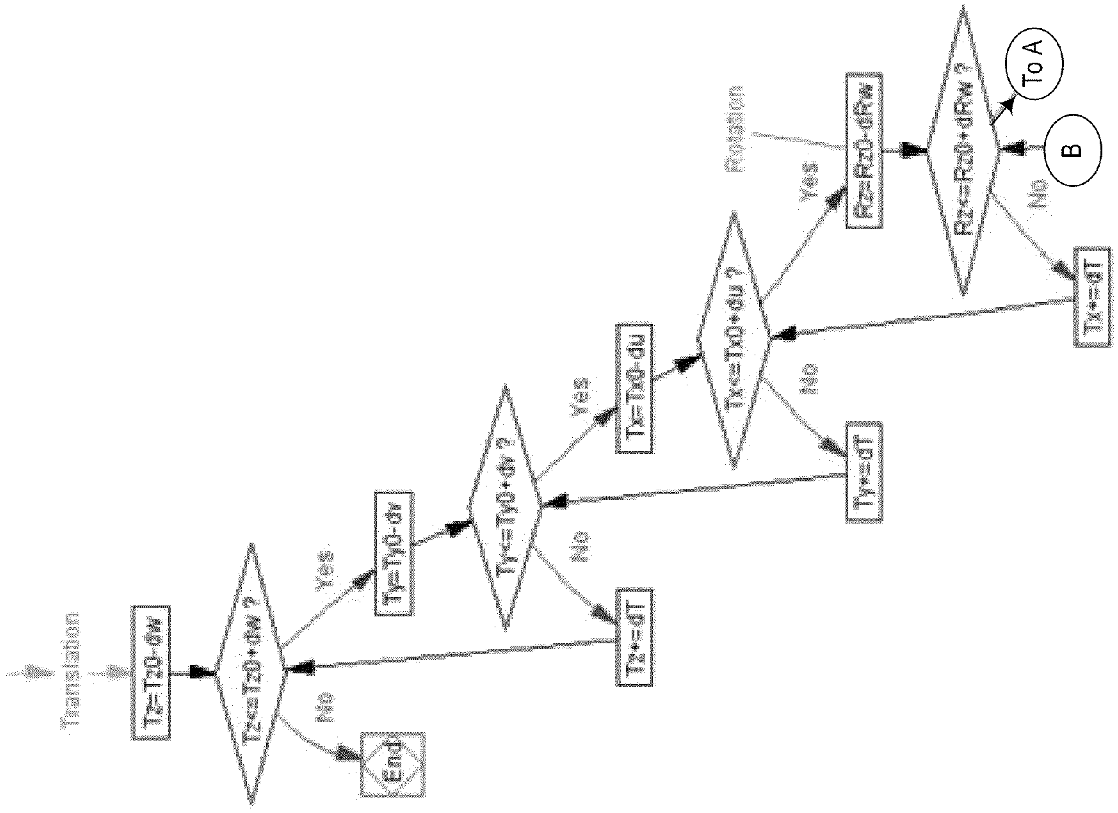
Figure 3F:
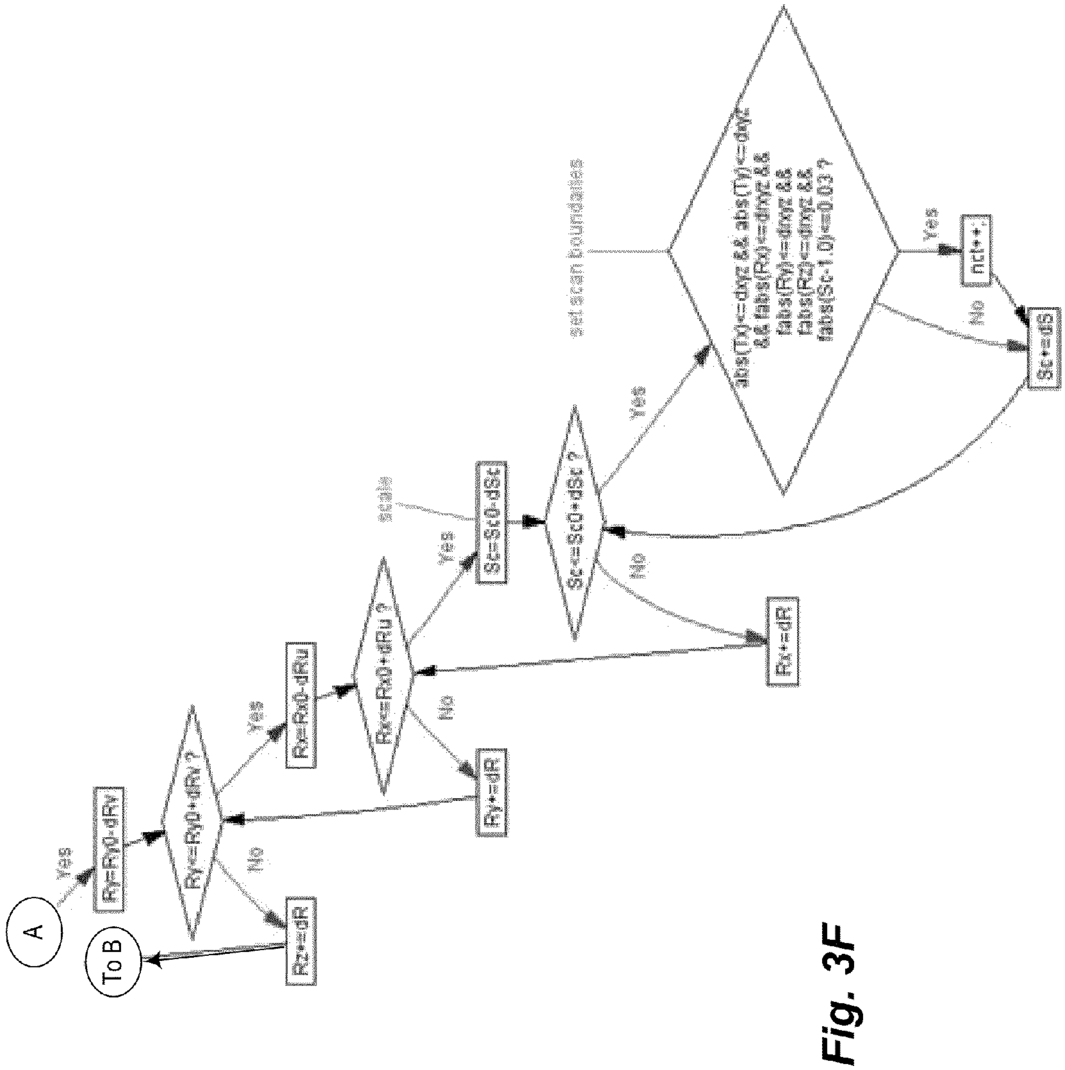

FIGS. 3E and 3F illustrate a process for iterating over the seven degrees of freedom.

Figure 3G:
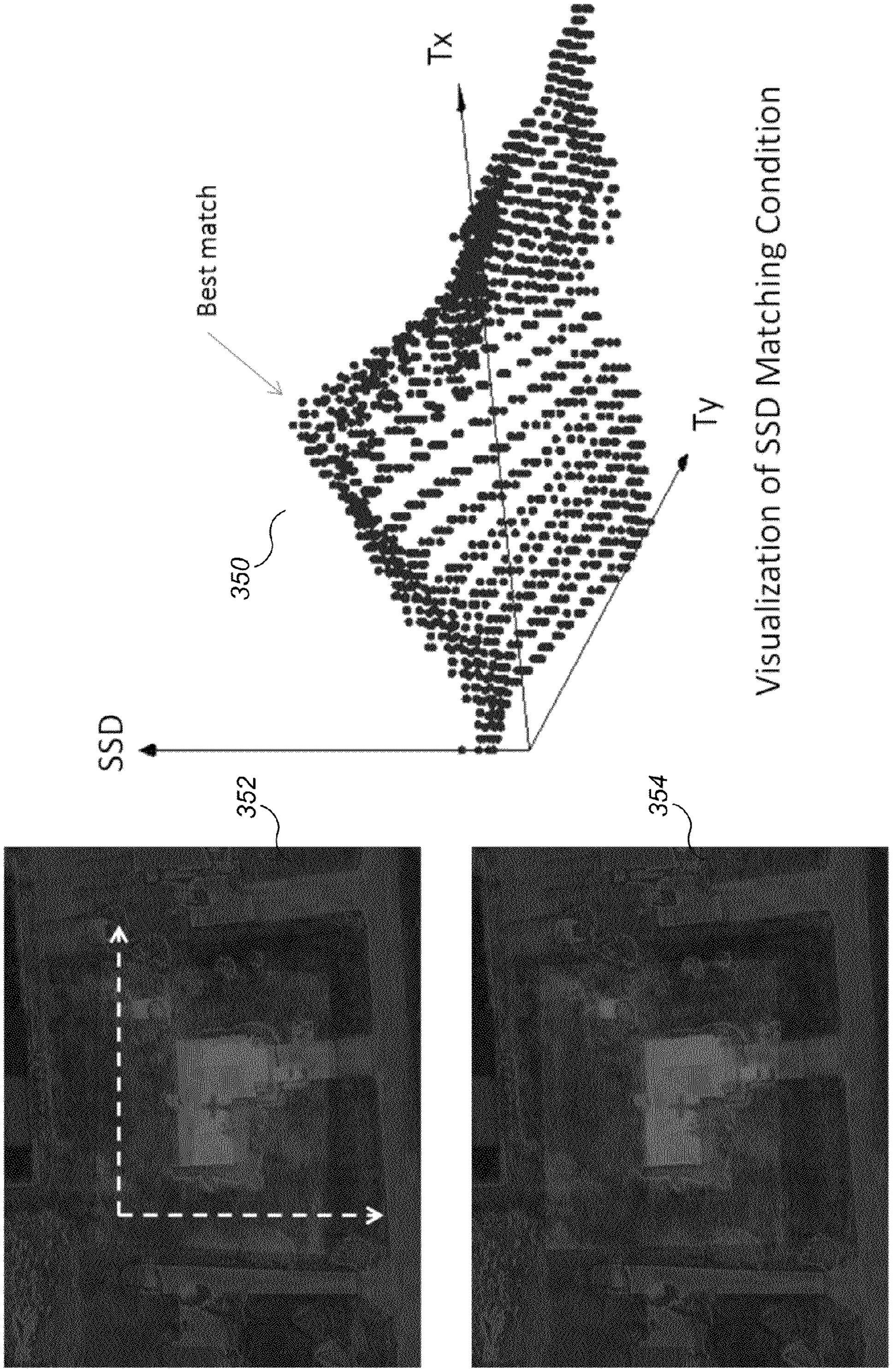

FIG. 3G shows a graph 350 and images 352 and 354. The graph 350 depicts a three dimensional slice of the seven dimensional (7D) error function space depicting the minima in the error functions. The values have been inverted to show the minima as a peak rather than a valley. Images 352 and 354 are each an overhead image (red channel) with an oblique image (blue channel) overlaid. Image 352 represents the initial conditions. Image 354 represents an improved fit resulting from a reduction of the SSD error function.

Figure 3H:
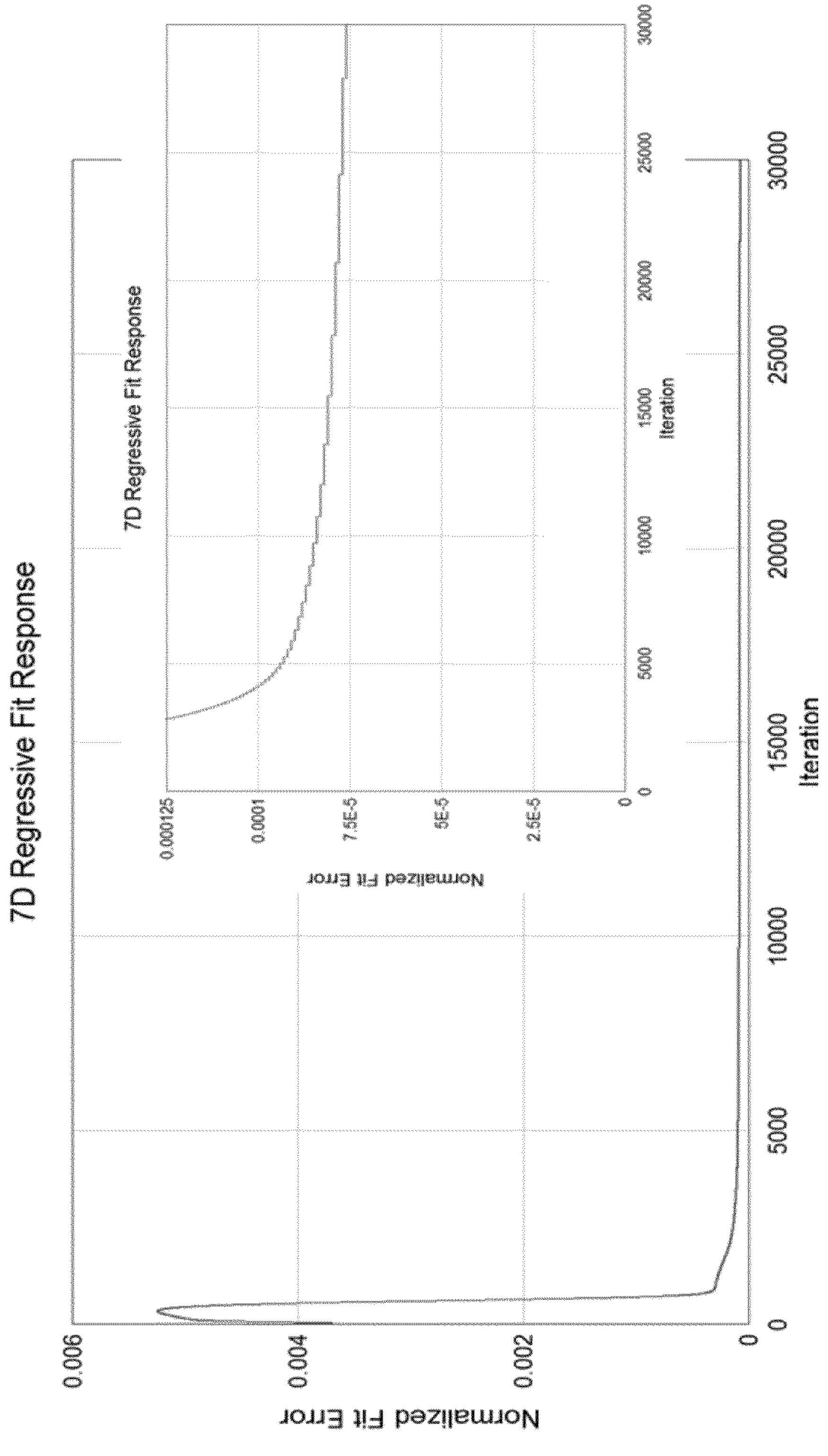

FIG. 3H depicts the convergence of the SSD function by way of a reduction of the error function.

Figure 3I:

FIG. 3I includes an image 360 that represents example initial conditions. In particular image 360 represents an overhead image (red channel) with a mapped oblique image (blue channel) overlaid.

Figure 3J:
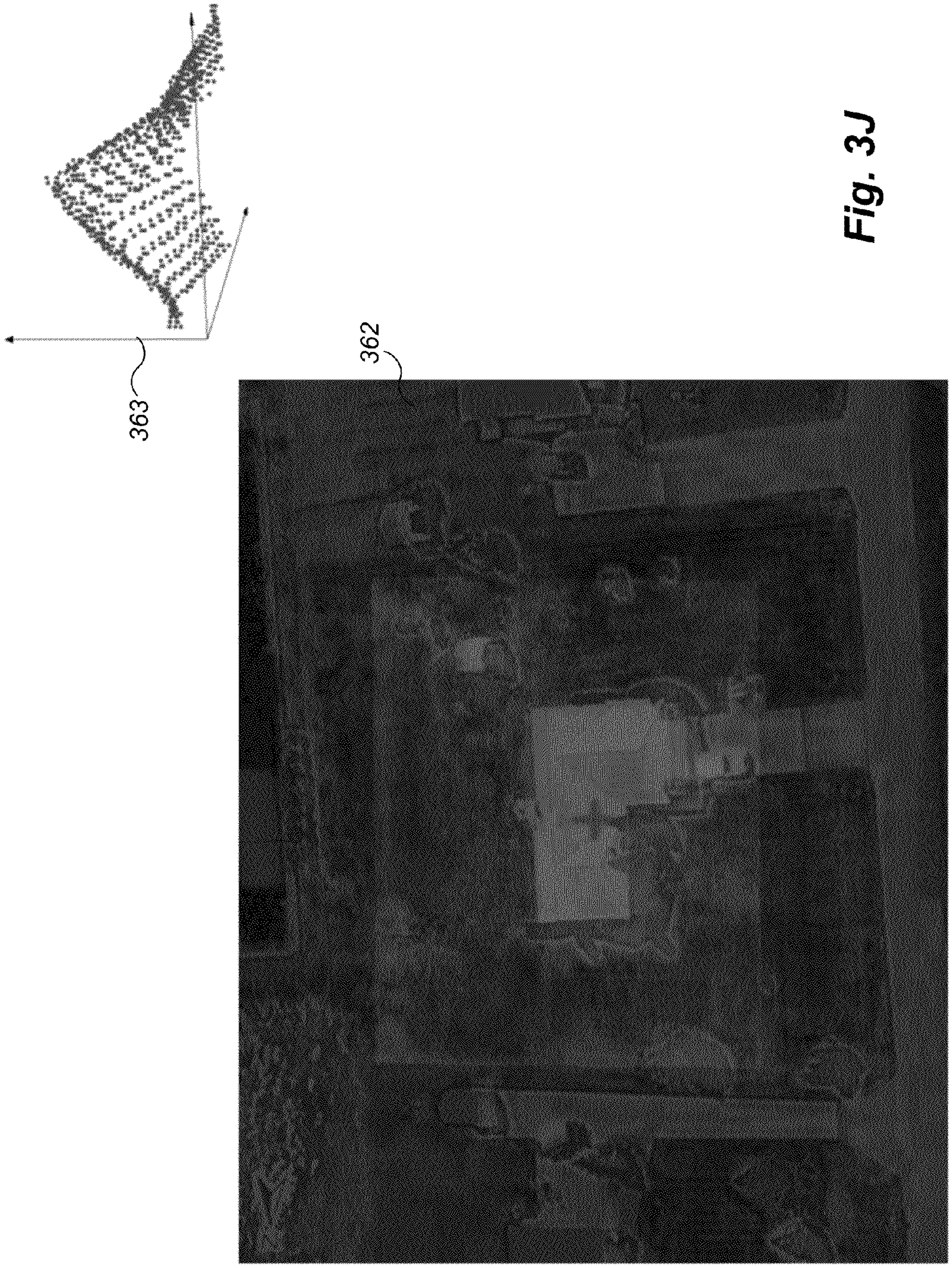

FIG. 3J illustrates results of the automated registration process after a coarse a sampling of the 7D error function space to determine a reduced value or an approximate minimum of the SSD function. In particular, image 362 represents an overhead image (red channel) with a mapped oblique image (blue channel) overlaid. Graph 363 represents the coarse sampling of the 7D error function space, with an approximate minimum shown (again using inverted values).

Figure 3K:
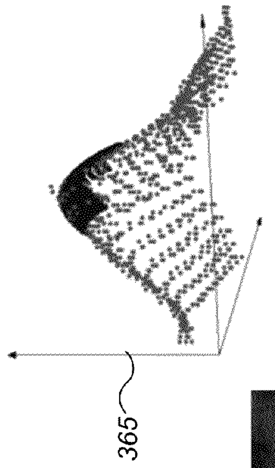
Figure 3K:

FIG. 3K illustrates results after finer sampling of the 7D error function space to determine a minima or a reduced value of the SSD function. In this case, a surface was fit to the SSD function surface to determine a better estimate of the reduced value or minima. Alternatively, a finer sampling of the 7D error function space in the vicinity of the approximate minima discussed in FIG. 3J could be made to directly compute a more accurate location of the minima. Image 364 represents an overhead image (red channel) with a mapped oblique image (blue channel) overlaid. Graph 365 represents the coarse sampling of the 7D error function space, with an approximate minimum shown (again using inverted values).

4. Implementation Techniques

Figure 4:
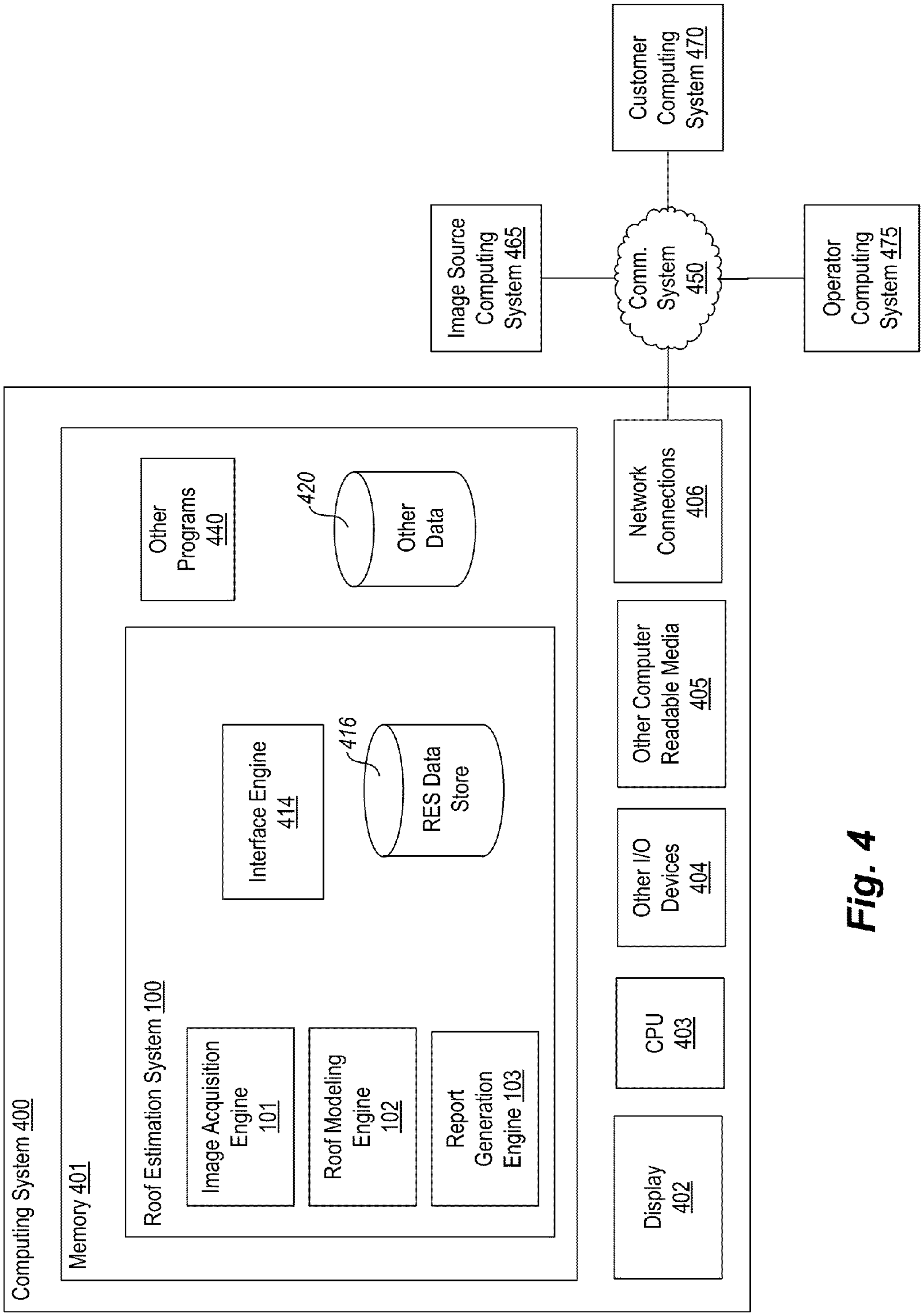
FIG. 4 is an example block diagram of a computing system for practicing embodiments of a roof estimation system.

FIG. 4 is an example block diagram of a computing system for practicing embodiments of a roof estimation system. FIG. 4 shows a computing system 400 that may be utilized to implement the Roof Estimation System ("RES") 100. One or more general purpose or special purpose computing systems may be used to implement the Roof Estimation System 100. More specifically, the computing system 400 may comprise one or more distinct computing systems present at distributed locations. In addition, each block shown may represent one or more such blocks as appropriate to a specific embodiment or may be combined with other blocks. Moreover, the various blocks of the Roof Estimation System 100 may physically reside on one or more machines, which use standard interprocess communication mechanisms (e.g., TCP/IP) to communicate with each other. Further, the Roof Estimation System 100 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., keyboard, mouse, joystick, track pad, CRT or LCD display, and the like), other computer-readable media 405, and network connections 406. The Roof Estimation System 100 is shown residing in memory 401. In other embodiments, some portion of the contents, some of, or all of the components of the Roof Estimation System 100 may be stored on and/or transmitted over the other computer-readable media 405. The components of the Roof Estimation System 100 preferably execute on one or more CPUs 403 and generate roof estimate reports, as described herein. Other code or programs 440 (e.g., a Web server, a database management system, and the like) and potentially other data repositories, such as data repository 420, also reside in the memory 401, and preferably execute on one or more CPUs 403. Not all of the components in FIG. 4 are required for each implementation. For example, some embodiments embedded in other software do not provide means for user input, for display, for a customer computing system, or other components.

In a typical embodiment, the Roof Estimation System 100 includes an image acquisition engine 101, a roof modeling engine 102, a report generation engine 103, an interface engine 414, and a roof estimation system data repository 416. Other and/or different modules may be implemented. In addition, the Roof Estimation System 100 interacts via a communication system 450 with an image source computing system 465, an operator computing system 475, and/or a customer computing system 470. Communication system 450 may utilize one or more protocols to communicate via one or more physical networks, including local area networks, wireless networks, dedicated lines, internets, the Internet, and the like.

The image acquisition engine 101 performs at least some of the functions described with respect to FIG. 1, above. In particular, the image acquisition engine 101 interacts with the image source computing system 465 to obtain one or more images of a building, and stores those images in the Roof Estimation System data repository 416 for processing by other components of the Roof Estimation System 100. In some embodiments, the image acquisition engine 101 may perform one or more pre-processing techniques used for automatic roof detections, such as watershed or Edison-style segmentation of images.

The roof modeling engine 102 performs at least some of the functions described with reference to FIG. 1, above. In particular, the roof modeling engine 102 generates a model based on one or more images of a building that are obtained from the Roof Estimation System data repository 416 or directly from the image source computing system 465. As noted, model generation may be performed semi-automatically, based on at least some inputs received from the operator computing system 475.

In addition, at least some aspects of the model generation may be performed automatically, based on image processing and/or image understanding techniques. In particular, the roof modeling engine 102 can automatically detect a roof in a target image of a building, based on an AI system trained on historical image data and/or a region of interest specified in the target image. As noted, the AI system may be implemented as part of the roof modeling engine 102 or some module. The AI system may also include one or more decision-support modules, such as associative neural networks, Bayesian networks, Hidden Markov Models, and the like. The roof modeling engine 102 may also be configured to automatically register images. These automated and semi-automated techniques are further described with respect to FIGS. 2 and 3, above. After the roof modeling engine 102 generates a model, it stores the generated model in the Roof Estimation System data repository 416 for further processing by other components of the Roof Estimation System 100.

The report generation engine 103 performs at least some of the functions described with reference to FIG. 1, above. In particular, the report generation engine 103 generates roof reports based on models stored in the Roof Estimation System data repository 416. Generating a roof report may include preparing one or more views of a given 3D model of a roof, annotating those views with indications of various characteristics of the model, such as dimensions of sections or other features (e.g., ridges, valleys, etc.) of the roof, slopes of sections of the roof, areas of sections of the roof, etc. In some embodiments, the report generation engine 103 facilitates transmission of roof measurement information that may or may not be incorporated into a roof estimate report. For example, the roof generation engine 103 may transmit roof measurement information based on, or derived from, models stored in the Roof Estimation System data repository 416. Such roof measurement information may be provided to, for example, third-party systems that generate roof estimate reports based on the provided information.

The interface engine 414 provides a view and a controller that facilitate user interaction with the Roof Estimation System 100 and its various components. For example, the interface engine 414 may implement a user interface engine 104 described with reference to FIG. 1. The user interface engine 104 may provide an interactive graphical user interface that can be used by a human user operating the operator computing system 475 to interact with, for example, the roof modeling engine 102, to perform functions such as specifying regions of interest for automated roof detection. In at least some embodiments, access to the functionality of the interface engine 414 is provided via a Web server, possibly executing as one of the other programs 440.

In some embodiments, the interface engine 414 provides programmatic access to one or more functions of the Roof Estimation System 100. For example, the interface engine 414 provides a programmatic interface (e.g., as a Web service, static or dynamic library, etc.) to one or more roof estimation functions of the Roof Estimation System 100 that may be invoked by one of the other programs 440 or some other module. In this manner, the interface engine 414 facilitates the development of third-party software, such as user interfaces, plug-ins, adapters (e.g., for integrating functions of the Roof Estimation System 100 into desktop applications, Web-based applications, embedded applications, etc.), and the like. In addition, the interface engine 414 may be in at least some embodiments invoked or otherwise accessed via remote entities, such as the operator computing system 475, the image source computing system 465, and/or the customer computing system 470, to access various roof estimation functionality of the Roof Estimation System 100.

The Roof Estimation System data repository 416 stores information related the roof estimation functions performed by the Roof Estimation System 100. Such information may include image data 105, model data 106, and/or report data

107 described with reference to FIG. 1. Furthermore, the data repository 416 may include information related to automatic roof detection and/or image registration. Such information includes historical image data, representations of trained AI system, and the like. In addition, the Roof Estimation System data repository 416 may include information about customers, operators, or other individuals or entities associated with the Roof Estimation System 100.

In an example embodiment, components/modules of the Roof Estimation System 100 are implemented using standard programming techniques. For example, the Roof Estimation System 100 may be implemented as a "native" executable running on the CPU 403, along with one or more static or dynamic libraries. In other embodiments, the Roof Estimation System 100 is implemented as instructions processed by a virtual machine that executes as one of the other programs 440. In general, a range of programming languages known in the art may be employed for implementing such example embodiments, including representative implementations of various programming language paradigms, including but not limited to, object-oriented (e.g., Java, C++, C#, Matlab, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments execute concurrently and asynchronously, and communicate using message passing techniques. Equivalent synchronous embodiments are also supported by an Roof Estimation System implementation. Also, other functions could be implemented and/or performed by each component/module, and in different orders, and by different components/modules, yet still achieve the functions of the RES.

In addition, programming interfaces to the data stored as part of the Roof Estimation System 100, such as in the Roof Estimation System data repository 416, can be available by standard mechanisms such as through C, C++, C#, and Java APIs; libraries for accessing files, databases, or other data repositories; through scripting languages such as XML; or through Web servers, FTP servers, or other types of servers providing access to stored data. For example, the Roof Estimation System data repository 416 may be implemented as one or more database systems, file systems, memory buffers, or any other technique for storing such information, or any combination of the above, including implementations using distributed computing techniques.

Also, the example Roof Estimation System 100 can be implemented in a distributed environment comprising multiple, even heterogeneous, computer systems and networks. For example, in one embodiment, the image acquisition engine 101, the roof modeling engine 102, the report generation engine 103, the interface engine 414, and the data repository 416 are all located in physically different computer systems. In another embodiment, various modules of the Roof Estimation System 100 are hosted each on a separate server machine and are remotely located from the tables which are stored in the data repository 416. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like).

Furthermore, in some embodiments, some or all of the components of the Roof Estimation System are implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 5:
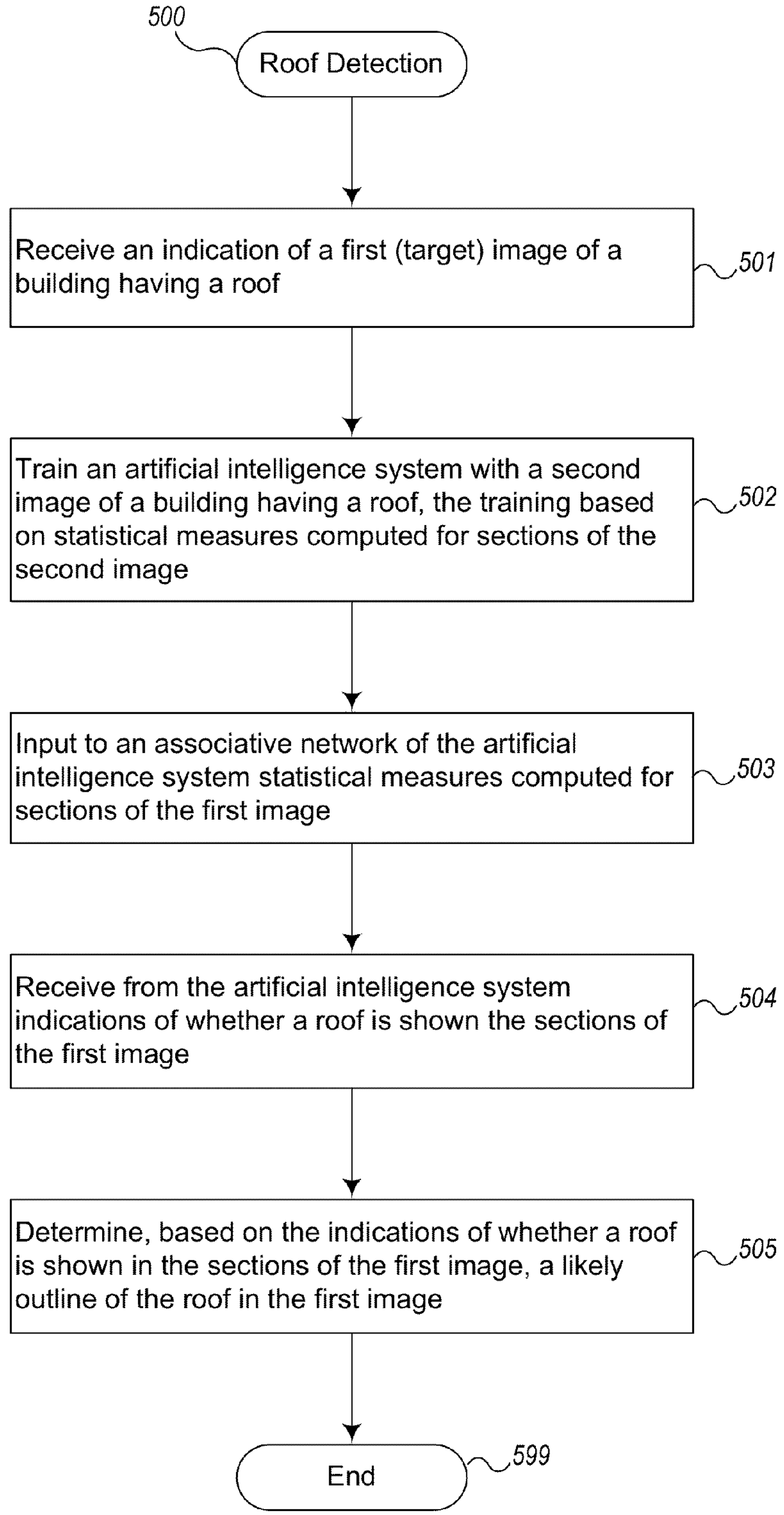
FIG. 5 is an example flow diagram of roof detection routine provided by an example embodiment.

FIG. 5 is an example flow diagram of roof detection routine provided by an example embodiment. The illustrated routine 500 may be provided by, for example, execution of the roof estimation system 100 described with respect to FIG. 4. The illustrated routine 500 detects a roof in an image of a building.

More specifically the routine begins in step 501, where it receives an indication of a first (target) image of a building having a roof. The target image is the image in which a roof is to be detected.

In step 502, the routine trains an artificial intelligence system with a second image of a building having a roof, the training based on statistical measures computed for sections of the second image. Image sections may be individual pixels or regions of pixels. The training results in the artificial intelligence system being configured to indicate whether a roof is shown in a section of an image. In one embodiment, training the artificial intelligence system includes training an associative network using historical image data that includes both multiple images and indications of which sections of the multiple images are roof areas.

In another embodiment, the first and second images are the same image, and training the artificial intelligence system includes training an associative network upon an operator-specified region of interest.

In addition, in some embodiments, multiple associative networks may be trained against various statistical measures. Furthermore, different types of associative networks may be utilized, including neural networks, Bayesian networks, and the like.

In one embodiment, step 502 is performed previously and is not part of the inventive method of identifying a roof. An associative network, artificial intelligence system and/or data arrangement, or other computer system is separately created and the training is completed thereon prior to the execution of the process 500. The step 502 therefore does not form part of the invention and is not one of the invention steps in this embodiment. Rather, the image is received at 501 and, having been input to the associative network at 503, the network performs the statistical analysis and outputs in 504 indications of the roof and an outline of the roof. Thus, this method of the invention does not include 502.

In step 503, the routine inputs to an associative network of the artificial intelligence system statistical measures computed for sections of the first image. Example statistical measures are described with respect to FIG. 2F, above.

In step 504, the routine receives from the artificial intelligence system indications of whether a roof is shown the sections of the first image. These indications may be likelihoods (probabilities) or some other measure, such as a degree of association of features measured in each image section with roof or non-roof areas of the training data.

In step 505, the routine determines, based on the indications of whether a roof is shown in the sections of the first image, a likely outline of the roof in the first image. Determining the roof outline may be performed in various ways. In one embodiment, the routine determines watershed segments for the first image, based on boundary gradient amplitudes. Then, for each watershed segment, the routine determines, based on the output of the associative network within the artificial intelligence system, a likelihood that the watershed segment includes a roof. The routine then uses the determined likelihoods to decide whether to retain or discard watershed segments as part of the detected roof.

In another embodiment, determining the roof outline includes determining Edison segments of the first image, such that the pixels of each of the Edison segments have similar textural content. Then, for each of the Edison segments, the routine determines, based on the output of the associative network within the artificial intelligence system, whether the Edison segment is similar to an operator-specified region of interest, and if so, includes the Edison segment in the outline of the detected roof.

After step 505, the routine ends. In other embodiments, the routine returns to one of the above steps to perform additional processing, such as to detect building roofs in other images. Other functions may also be performed. For example, after step 505, the routine 500 may generate a roof estimate report based at least in part on the determined likely outline of the roof in the target image.

Figure 6:
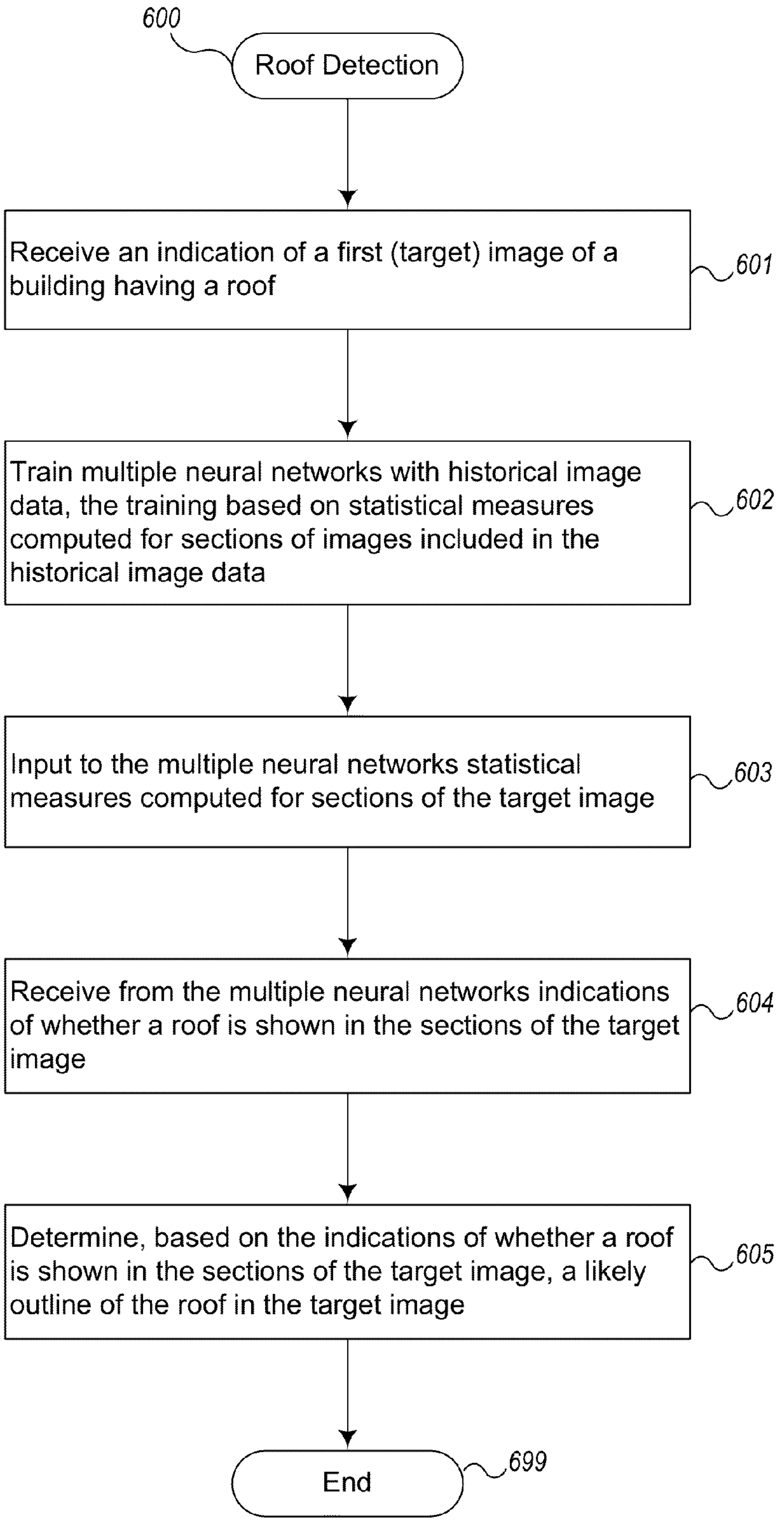
FIG. 6 is an example flow diagram of another roof detection routine provided by an example embodiment.

FIG. 6 is an example flow diagram of another roof detection routine provided by an example embodiment. The illustrated routine 600 may be provided by, for example, execution of the roof estimation system 100 described with respect to FIG. 4. The illustrated routine 600 detects a roof in an image of a building.

More specifically the routine begins in step 601, where it receives an indication of a first (target) image of a building having a roof. In step 602, the routine trains multiple neural networks with historical image data, the training based on statistical measures computed for sections of images included in the historical image data. The training results in the multiple neural networks being configured to discriminate between roof and non-roof sections of an image. In step 603, the routine inputs to the multiple neural networks statistical measures computed for sections of the target image. Step 602 can be omitted and the inventive steps carried out going from 601 to 603. In step 604, the routine receives from the multiple neural networks indications of whether a roof is shown in the sections of the target image. In step 605, the routine determines, based on the indications of whether a roof is shown in the sections of the target image, a likely outline of the roof in the target image. After step 605, the routine ends.

In other embodiments, the routine 600 returns to one of the above steps to perform additional processing, such as to detect building roofs in other images. Other functions may also be performed. For example, after step 605, the routine 600 may store the determined likely outline of the roof, such that the outline can be used to generate a roof estimate report or the like.

Figure 7:
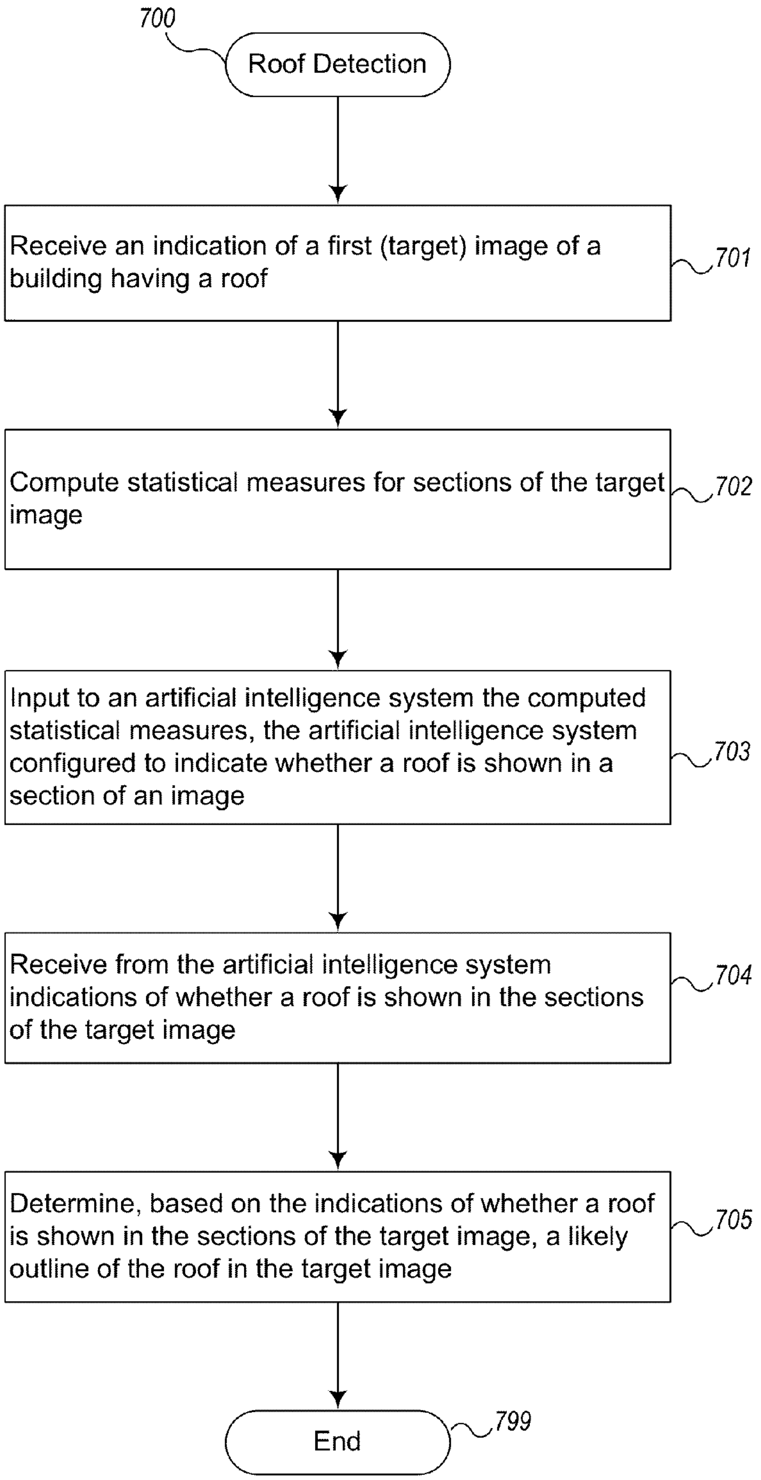
FIG. 7 is an example flow diagram of a further roof detection routine provided by an example embodiment.

FIG. 7 is an example flow diagram of a further roof detection routine provided by an example embodiment. The illustrated routine 700 may be provided by, for example, execution of the roof estimation system 100 described with respect to FIG. 4. The illustrated routine 700 detects a roof in an image of a building.

More specifically the routine begins in step 701, where it receives an indication of a first (target) image of a building having a roof. In step 702, the routine computes statistical measures for sections of the target image. In step 703, the routine inputs to an artificial intelligence system the computed statistical measures, the associative network configured to indicate whether a roof is shown in a section of an image. In step 704, the routine receives from the artificial intelligence system indications of whether a roof is shown in the sections of the target image. In step 705, the routine determines, based on the indications of whether a roof is shown in the sections of the target image, a likely outline of the roof in the target image. After step 705, the routine ends. In other embodiments, the routine returns to one of the above steps to perform additional processing, such as to detect building roofs in other images.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/197,895, entitled "AUTOMATED TECHNIQUES FOR ROOF ESTIMATION," filed Oct. 31, 2008, are incorporated herein by reference, in their entireties.

From the foregoing it will be appreciated that, although specific embodiments have been described herein for purposes of illustration, various modifications may be made without deviating from the spirit and scope of the present disclosure. For example, the methods, systems, and techniques for generating and providing roof estimate reports discussed herein are applicable to other architectures other than the illustrated architecture or a particular roof estimation system implementation. Also, the methods and systems discussed herein are applicable to differing network protocols, communication media (optical, wireless, cable, etc.) and devices (such as wireless handsets, electronic organizers, personal digital assistants, portable email machines, game machines, pagers, navigation devices such as GPS receivers, etc.). Further, the methods and systems discussed herein may be utilized by and/or applied to other contexts or purposes, such as by or for solar panel installers, roof gutter installers, awning companies, HVAC contractors, general contractors, and/or insurance companies.

The invention claimed is:

1. A non-transitory computer-readable storage medium whose contents enable a computing system to detect a building feature in an image having the feature, by performing a method comprising:

receiving a target image of a building;

computing statistical measures for at least one selected section of the building feature within the target image of the building, the statistical measures determined for each pixel of the image within a sampling window around the pixel;

training a statistical model system on the computed statistical measures to identify distinguishing characteristics of the building feature;

receiving from the statistical model system indications of portions outside of the selected section of the target image identified as part of the building feature;

determining, based on the received indications of portions of the target image, a likely outline of the building feature in the target image; and storing the determined likely outline of the building feature.

2. The non-transitory computer-readable storage medium of claim 1 wherein the building feature is one of a roof, window, wall or chimney.

3. The non-transitory computer-readable storage medium of claim 1 wherein training the statistical model system includes receiving from an operator an indication of the selection section of the building feature within the target image.

4. The non-transitory computer-readable storage medium of claim 1 wherein the method further comprises:

training the statistical model system with image data that includes multiple images, each of the multiple images having the building feature, the historical image data further including indications specifying a location of the building feature in each of the multiple images.

5. The non-transitory computer-readable storage medium of claim 1 wherein determining the likely outline of the building feature includes segmenting the target image based on image gradients or textural similarity.

6. A method comprising:

inputting to a statistical model system statistical measures computed for at least one section of a feature within a first image, the statistical model system configured to indicate whether a feature is shown in portions of an image and the statistical measures determined for each pixel of the image within a sampling window around the pixel;

receiving from the statistical model system indications of portions outside of the selected section of the first image identified as part of the feature;

determining, based on the received indications of portions of the first image identified as part of the feature, a likely outline of the feature in the first image; and storing the determined likely outline of the feature in the first image.

7. The method of claim 6 further comprising training the statistical model system with multiple images and indications of which sections of the multiple images are areas of the feature.

8. The method of claim 6, further comprising training one or more additional statistical model systems, each of the one or more additional statistical model systems trained on a respective statistical measure.

9. The method of claim 8 wherein training the one or more additional statistical model systems includes training at least one of the one or more additional statistical model systems to indicate whether something other than the feature is shown in a section of an image.

10. The method of claim 9 wherein determining the likely outline of the feature in the first image is further based on indications of whether something other than the feature is shown in the sections of the first image, the indications received from the at least one of the one or more additional statistical model systems.

11. The method of claim 6 wherein determining the likely outline of the feature in the first image includes determining a likelihood that each of the sections of the first image is showing a feature.

12. The method of claim 6, further comprising:

determining watershed segments of the first image, based on boundary gradient amplitudes;

for each of the determined watershed segments, determining a likelihood that the watershed segment includes the feature; and determining the likely outline of the feature in the first image based on the determined likelihood that each of the watershed segments includes the feature.

13. The method of claim 6, further comprising:

receiving an operator-specified region of interest in the first image; and training the statistical model system with data from the region of interest in the first image.

14. The method of claim 13 wherein the operator-specified region of interest identifies a portion of the feature in the first image.

15. The method of claim 13, further comprising:

determining Edison segments of the first image, pixels of each of the determined Edison segments having similar textural content; and for each of the determined Edison segments, determining, based on the trained statistical model system, whether the Edison segment is similar to the region of interest; and if the Edison segment is similar to the region of interest, including the Edison segment in the likely outline of the feature.

16. The method of claim 6 wherein the statistical measures include at least one of a surface fractal analysis measure, a wavelet coefficient measure, a topological contour complexity variation (TCCV) measure, a radial complexity measure, and a radial organization variation measure.

17. The method of claim 6 wherein training the statistical model system includes training a neural network.

18. A computing system, comprising:

a memory; and a module stored on the memory and configured, when executed, to automatically detect a feature in a target image of a property having a feature by:

training multiple neural networks with image data, the training based on statistical measures computed for sections of images included in the image data, the statistical measures being a vector determined for each pixel of the image within a sampling window around the pixel and the training resulting in the multiple neural networks being configured to discriminate between feature and non-feature sections of an image;

inputting to the multiple neural networks statistical measures computed for sections of the target image;

receiving from the multiple neural networks indications of portions of the target image identified as part of the feature;

determining, based on the indications of portions outside of the selected sections of the target image identified as part of the feature, a likely outline of the feature in the target image; and storing on the memory the determined likely outline of the feature in the target image.

19. The system of claim 18 wherein the image data includes multiple images, each of the multiple images being of a property having the feature, the image data further including indications specifying locations of the feature in each of the multiple images.

20. The system of claim 18 wherein the module is further configured to automatically detect the feature in the target image by:

determining watershed segments of the target image; and determining the likely outline of the feature in the target image based on the determined watershed segments and the multiple neural networks.

* * * * *